US012785871B2

(12) United States Patent
Shen et al.

(10) Patent No.: US 12,785,871 B2
(45) Date of Patent: Nov. 3, 2026

(54) FREQUENCY HOPPING INDICATION METHOD AND APPARATUS

(71) Applicant: DATANG MOBILE COMMUNICATIONS EQUIPMENT CO., LTD., Beijing (CN)

(72) Inventors: Shuling Shen, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 343 days.

(21) Appl. No.: 18/294,543

(22) PCT Filed: Jun. 9, 2022

(86) PCT No.: PCT/CN2022/097906

§ 371 (c)(1),
(2) Date: Feb. 2, 2024

(87) PCT Pub. No.: WO2023/011000

PCT Pub. Date: Feb. 9, 2023

(65) Prior Publication Data

US 2024/0356691 A1 Oct. 24, 2024

(30) Foreign Application Priority Data

Aug. 5, 2021 (CN) ......................... 202110897238.9

(51) Int. Cl.
*H04L 5/00* (2006.01)
*H04W 72/0446* (2023.01)
(Continued)

(52) U.S. Cl.
CPC ....... *H04L 5/0012* (2013.01); *H04W 72/0446* (2013.01); *H04W 72/1268* (2013.01); *H04W 72/231* (2023.01)

(58) Field of Classification Search
CPC ... H04L 5/0012; H04L 5/0044; H04L 5/0053; H04L 5/0094; H04W 72/0446;
(Continued)

(56) References Cited

U.S. PATENT DOCUMENTS

2018/0109286 A1 4/2018 Yao et al.
2021/0037519 A1* 2/2021 Matsumura ......... H04J 13/0074
2021/0218437 A1 7/2021 Khoshnevisan et al.

FOREIGN PATENT DOCUMENTS

CN 112118625 A 12/2020
CN 112449419 A 3/2021
(Continued)

OTHER PUBLICATIONS

ISA State Intellectual Property Office of the People's Republic of China, International Search Report Issued in Application No. PCT/CN2022/097906, Aug. 25, 2022, WIPO, 6 pages.
(Continued)

*Primary Examiner* — Huy C Ho
(74) *Attorney, Agent, or Firm* — KILPATRICK TOWNSEND & STOCKTON LLP

(57) ABSTRACT

Embodiments of the present disclosure provide a frequency hopping indication method and apparatus. The method is applied to a terminal device, and comprises: receiving high-layer signaling sent by a network device, the high-layer signaling being configured with a first frequency hopping mode or candidate frequency hopping modes; and determining, on the basis of the high-layer signaling, a frequency hopping mode of an uplink channel corresponding to the terminal device. According to the frequency hopping indication method and apparatus provided in the embodiments of the present disclosure, the first frequency hopping mode of the uplink channel is determined according to the high-layer signaling by configuring the newly added first frequency hopping mode in the high-layer signaling; and when
(Continued)

frequency hopping modes are configured in the high-layer signaling, dynamic switching between frequency hopping modes is implemented.

20 Claims, 3 Drawing Sheets

(51) Int. Cl.
*H04W 72/1268* (2023.01)
*H04W 72/231* (2023.01)

(58) Field of Classification Search
CPC ........... H04W 72/1268; H04W 72/231; H04B 1/713; H04B 1/7143; Y02D 30/70
USPC .......................................................... 370/329
See application file for complete search history.

(56) References Cited

FOREIGN PATENT DOCUMENTS

| | | | |
|---|---|---|---|
| CN | 112449420 | A | 3/2021 |
| EP | 4072089 | A1 | 10/2022 |
| WO | 2016183739 | A1 | 11/2016 |
| WO | 2021149940 | A1 | 7/2021 |
| WO | 2022236675 | A1 | 11/2022 |

OTHER PUBLICATIONS

ISA State Intellectual Property Office of the People's Republic of China, written opinion Issued in Application No. PCT/CN2022/097906, Aug. 25, 2022, WIPO, 4 pages.
Moderator (China Telecom) "FL Summary of joint channel estimation for PUSCH" 3GPP TSG RAN WG1 Meeting #105-e, E-Meeting, May 10-27, 2021, total 37 pages, R1-2105979.
Moderator (ZTE Corporation) "Final feature lead summary on support of Type A PUSCH repetitions for Msg3", 3GPP TSG RAN WG1 #105-e, e-Meeting, May 10-27, 2021, total 84 pages, R1-2106247.
State Intellectual Property Office of the People's Republic of China, Search Report Issued in Application No. 202110897238.9, Nov. 26, 2024.
Ericsson, "Joint Channel Estimation for PUSCH", 3GPP TSG-RAN WG1 Meeting #105-e, e-Meeting, May 10-May 27, 2021, total 17 pages, R1-2105654.
European Patent Office, Extended European Search Report Issued in Application No. 22851716.5, Nov. 5, 2024, Germany, 10 pages.

* cited by examiner

FREQUENCY HOPPING INDICATION METHOD AND APPARATUS

CROSS-REFERENCE TO RELATED APPLICATION

The present application is a National Stage of International Application No. PCT/CN2022/097906, filed on Jun. 9, 2022, which claims priority to Chinese patent application No. 202110897238.9 filed on Aug. 5, 2021, entitled "Frequency Hopping Indication Method and Apparatus", which are hereby incorporated by reference in their entireties.

FIELD

The present application relates to the field of radio communication, and particular to frequency hopping indication methods and apparatuses.

BACKGROUND

In the field of radio communication, during the research of Rel-17 on coverage enhancement, a scheme is proposed to improve the uplink channel transmission performance through joint channel estimation. The prerequisites for joint channel estimation are stable power and continuous phase. The frequency hopping pattern supported in Rel-16 may disrupt phase continuity in case of changing frequency domain positions, and joint channel estimation cannot be performed in case that only one uplink channel is in each hop. Therefore, to obtain both frequency hopping gain and joint channel estimation gain simultaneously, a new frequency hopping pattern is proposed in Rel-17.

Traditional protocols have no mechanism for indicating a terminal device, such as user equipment (UE), to perform the new frequency hopping pattern proposed by Rel-17. In addition, as the states and conditions of the channel vary, UE may not be in a limited-coverage scenario for a long time, and it is not necessary to adopt the new frequency hopping pattern proposed by Rel-17 constantly. The current protocol does not have a solution for dynamically switching two different frequency hopping patterns either.

SUMMARY

In response to the problems in the related art, the embodiments of the present application provide frequency hopping indication methods and apparatuses.

An embodiment of the present application provides a frequency hopping indication method, applied to a terminal device, including:

- receiving a higher layer signaling transmitted from a network device, where the higher layer signaling is configured with a first frequency hopping pattern or multiple candidate frequency hopping patterns; and
- determining a frequency hopping pattern for an uplink channel corresponding to the terminal device based on the higher layer signaling.

In an embodiment, in case that the uplink channel is a physical uplink shared channel (PUSCH), the method further includes:

- receiving first downlink control information (DCI) transmitted from the network device;
- the determining the frequency hopping pattern for the uplink channel corresponding to the terminal device based on the higher layer signaling includes:
- determining the first frequency hopping pattern based on the higher layer signaling in case that the higher layer signaling is configured with the first frequency hopping pattern; and
- determining the first frequency hopping pattern as enabled or disabled based on the first DCI.

In an embodiment, the determining the first frequency hopping pattern includes:

- determining the first frequency hopping pattern based on a first information element (IE) configured in PUSCH-config by the higher layer signaling; or
- determining the first frequency hopping pattern based on a second IE configured in PUSCH-config by the higher layer signaling; or
- determining the first frequency hopping pattern based on a joint channel estimation (JCE) association configuration in the higher layer signaling, as well as an interSlot or interRepetition frequency hopping pattern configured in PUSCH-config by the higher layer signaling.

In an embodiment, in case that the uplink channel is a physical uplink control channel (PUCCH), the determining the frequency hopping pattern for the uplink channel corresponding to the terminal device based on the higher layer signaling includes:

- determining the first frequency hopping pattern based on the higher layer signaling in case that the higher layer signaling is configured with the first frequency hopping pattern.

In an embodiment, the determining the first frequency hopping pattern includes:

- determining the first frequency hopping pattern based on a third information element (IE) configured in PUCCH-config by the higher layer signaling; or
- determining the first frequency hopping pattern based on a joint channel estimation (JCE) association configuration in the higher layer signaling, as well as an interSlot frequency hopping pattern configured in PUCCH-config by the higher layer signaling.

In an embodiment, the JCE association configuration includes at least one of a time-domain window size, a time-domain frequency hopping interval, or a JCE enabled/disabled.

In an embodiment, determining the first frequency hopping pattern for the uplink channel corresponding to the terminal device as disabled in case that a value of the time-domain window size or the time-domain frequency hopping interval in the JCE association configuration is 1.

In an embodiment, the method further includes:

- receiving second downlink control information (DCI) transmitted from the network device;
- the determining the frequency hopping pattern for the uplink channel corresponding to the terminal device based on the higher layer signaling includes:
- determining configured multiple candidate frequency hopping patterns based on the higher layer signaling in case that the higher layer signaling is configured with the multiple candidate frequency hopping patterns; and
- determining the frequency hopping pattern for the uplink channel corresponding to the terminal device among the multiple candidate hopping patterns based on the second DCI.

In an embodiment, in case that the higher layer signaling is configured with the multiple candidate frequency hopping patterns, the determining the configured multiple candidate frequency hopping patterns based on the higher layer signaling includes:

determining the multiple candidate frequency hopping patterns based on the higher layer signaling in case that the uplink channel is a physical uplink shared channel (PUSCH); and determining the multiple candidate frequency hopping patterns based on the higher layer signaling in case that the uplink channel is a physical uplink control channel (PUCCH).

In an embodiment, in case that the uplink channel is PUSCH, the determining the multiple candidate frequency hopping patterns based on the higher layer signaling includes:

determining the multiple candidate frequency hopping patterns based on a first information element (IE) configured in PUSCH-config by the higher layer signaling; or determining the multiple candidate frequency hopping patterns based on a second IE configured in PUSCH-config by the higher layer signaling, where the first frequency hopping pattern among the multiple candidate frequency hopping patterns is determined based on the second IE configured in PUSCH-config by the higher layer signaling, and other frequency hopping patterns other than the first frequency hopping pattern among the multiple candidate hopping patterns are determined based on the first IE configured in PUSCH-config by the higher layer signaling; or determining the multiple candidate frequency hopping patterns including the first frequency hopping pattern based on a joint channel estimation (JCE) association configuration in the higher layer signaling.

In an embodiment, the determining the multiple candidate frequency hopping patterns based on the first IE configured in PUSCH-config by the higher layer signaling includes:

determined multiple candidate frequency hopping patterns include the first frequency hopping pattern.

In an embodiment, in case that the uplink channel is PUCCH, the determining the multiple candidate frequency hopping patterns based on the higher layer signaling includes:

determining the multiple candidate frequency hopping patterns based on a third information element (IE) configured in PUCCH-config by the higher layer signaling, where the first frequency hopping pattern among the multiple candidate frequency hopping patterns is determined based on the third IE configured in PUCCH-config by the higher layer signaling, and other frequency hopping patterns other than the first frequency hopping pattern among the multiple candidate hopping patterns are determined based on a fourth IE configured in PUCCH-config by the higher layer signaling; or determining the multiple candidate frequency hopping patterns including the first frequency hopping pattern based on a joint channel estimation (JCE) association configuration in the higher layer signaling.

In an embodiment, the JCE association configuration includes at least one of a time-domain window size, a time-domain frequency hopping interval, or a JCE enabled/disabled.

In an embodiment, determining the first frequency hopping pattern for the uplink channel corresponding to the terminal device as disabled in case that a value of the time-domain window size or the time-domain frequency hopping interval in the JCE association configuration is 1.

In an embodiment, the second DCI includes at least one of uplink DCI for scheduling a physical uplink shared channel (PUSCH) or downlink DCI for scheduling a physical downlink shared channel (PDSCH) corresponding to a hybrid automatic repeat request-acknowledge (HARQ-ACK) transmitted on a physical uplink control channel (PUCCH).

In an embodiment, the determining the frequency hopping pattern for the uplink channel corresponding to the terminal device based on the second DCI includes:

determining the frequency hopping pattern for the uplink channel corresponding to the terminal device based on a first indication field in the second DCI, where a state value of the first indication field corresponds one-to-one with the frequency hopping pattern; or determining the frequency hopping pattern for the uplink channel corresponding to the terminal device based on an expanded frequency hopping flag field in the second DCI, where a state value of the expanded frequency hopping flag field corresponds one-to-one with the frequency hopping pattern; or determining the frequency hopping pattern for the uplink channel corresponding to the terminal device based on a frequency hopping flag field in the second DCI, where a state value of the frequency hopping flag field corresponds one-to-one with the frequency hopping pattern.

An embodiment of the present application further provides a frequency hopping indication method, applied to a network device, including:

transmitting a higher layer signaling to a terminal device, where the higher layer signaling is configured with a first frequency hopping pattern or multiple candidate frequency hopping patterns.

In an embodiment, in case that an uplink channel is a physical uplink shared channel (PUSCH), transmitting the higher layer signaling to the terminal device includes:

transmitting the higher layer signaling to the terminal device and configuring the first frequency hopping pattern;

after the transmitting higher layer signaling to the terminal device, the method further includes:

transmitting first downlink control information (DCI) to the terminal device; and indicating the first frequency hopping pattern of the terminal device as enabled or disabled based on the first DCI.

In an embodiment, the configuring the first frequency hopping pattern includes:

configuring the first frequency hopping pattern based on a first information element (IE) configured in PUSCH-config by the higher layer signaling; or configuring the first frequency hopping pattern based on a second IE configured in PUSCH-config by the higher layer signaling; or configuring the first frequency hopping pattern based on a joint channel estimation (JCE) association configuration in the higher layer signaling, as well as an interSlot or interRepetition frequency hopping pattern configured in PUSCH-config by the higher layer signaling.

In an embodiment, in case that the uplink channel is a physical uplink control channel (PUCCH), the transmitting higher layer signaling to the terminal device includes:

transmitting the higher layer signaling to the terminal device and configuring the first frequency hopping pattern.

In an embodiment, the configuring the first frequency hopping pattern includes:

configuring the first frequency hopping pattern based on a third information element (IE) configured in PUCCH-config by the higher layer signaling; or configuring the first frequency hopping pattern based on a joint channel estimation (JCE) association configuration in the higher layer signaling, as well as an interSlot frequency hopping pattern configured in PUCCH-config by the higher layer signaling.

In an embodiment, the JCE association configuration includes at least one of a time-domain window size, a time-domain frequency hopping interval, or a JCE enabled/disabled.

In an embodiment, the transmitting the higher layer signaling to the terminal device includes:

transmitting the higher layer signaling to the terminal device, where the higher layer signaling is configured with the multiple candidate frequency hopping patterns;

after the transmitting the higher layer signaling to the terminal device, the method further includes:

transmitting second downlink control information (DCI) to the terminal device; and indicating, based on the second DCI, the terminal device to determine a frequency hopping pattern for a corresponding uplink channel among the multiple candidate hopping patterns.

In an embodiment, the transmitting the higher layer signaling to the terminal device, where the higher layer signaling is configured with the multiple candidate frequency hopping patterns includes:

in case that an uplink channel is a physical uplink shared channel (PUSCH), configuring the multiple candidate frequency hopping patterns based on the higher layer signaling;

in case that an uplink channel is a physical uplink control channel (PUCCH), configuring the multiple candidate frequency hopping patterns based on the higher layer signaling.

In an embodiment, in case that the uplink channel is PUSCH, configuring the multiple candidate frequency hopping patterns based on the higher layer signaling includes:

configuring the multiple candidate frequency hopping patterns based on a first information element (IE) configured in PUSCH-config by the higher layer signaling; or configuring the multiple candidate frequency hopping patterns based on a second IE configured in PUCCH-config by the higher layer signaling, where the first frequency hopping pattern among the multiple candidate hopping patterns is determined based on the second IE configured in PUSCH-config by the higher layer signaling, and other frequency hopping patterns other than the first frequency hopping pattern among the multiple candidate hopping patterns are determined based on the first IE configured in PUSCH-config by the higher layer signaling; or configuring the multiple candidate frequency hopping patterns including the first frequency hopping pattern based on a joint channel estimation (JCE) association configuration in the higher layer signaling.

In an embodiment, the determining the multiple candidate frequency hopping patterns based on the first IE configured in PUSCH-config by the higher layer signaling includes:

determined multiple candidate frequency hopping patterns include the first frequency hopping pattern.

In an embodiment, in case that the uplink channel is PUCCH, configuring the multiple candidate frequency hopping patterns based on the higher layer signaling includes:

determining the multiple candidate frequency hopping patterns based on a third information element (IE) configured in PUCCH-config by the higher layer signaling, where the first frequency hopping pattern among the multiple candidate frequency hopping patterns is determined based on the third IE configured in PUCCH-config by the higher layer signaling, and other frequency hopping patterns other than the first frequency hopping pattern among the multiple candidate hopping patterns are determined based on a fourth IE configured in PUCCH-config by the higher layer signaling; or configuring multiple candidate frequency hopping patterns including the first frequency hopping pattern based on a joint channel estimation (JCE) association configuration in the higher layer signaling.

In an embodiment, the JCE association configuration includes at least one of a time-domain window size, a time-domain frequency hopping interval, or a JCE enabled/disabled.

In an embodiment, the second DCI includes at least one of uplink DCI for scheduling a physical uplink shared channel (PUSCH) or downlink DCI for scheduling a physical downlink shared channel (PDSCH) corresponding to a hybrid automatic repeat request-acknowledge (HARQ-ACK) transmitted on a physical uplink control channel (PUCCH).

In an embodiment, the indicating the terminal device to determine the frequency hopping pattern for the corresponding uplink channel based on the second DCI includes:

indicating the terminal device to determine the frequency hopping pattern for the corresponding uplink channel based on a first indication field in the second DCI, where a state value of the first indication field corresponds one-to-one with the frequency hopping pattern; or indicating the terminal device to determine the frequency hopping pattern for the corresponding uplink channel based on an expanded frequency hopping flag field in the second DCI, where a state value of the expanded frequency hopping flag field corresponds one-to-one with the frequency hopping pattern; or indicating the terminal device to determine the frequency hopping pattern for the corresponding uplink channel based on a frequency hopping flag field in the second DCI, where a state value of the frequency hopping flag field corresponds one-to-one with the frequency hopping pattern.

An embodiment of the present application further provides a terminal device, including a memory, a transceiver, and a processor, where:

the memory is configured for storing a computer program; the transceiver is configured for transmitting and receiving data under control of the processor; the processor is configured for reading the computer program from the memory and implementing the steps of the frequency hopping indication method applied to the terminal device as described above.

An embodiment of the present application further provides a network side device, including a memory, a transceiver, and a processor, where:

the memory is configured for storing a computer program; the transceiver is configured for transmitting and receiving data under control of the processor; the processor is configured for reading the computer program from the memory and implementing the steps of the frequency hopping indication method applied to the network device as described above.

An embodiment of the present application further provides a frequency hopping indication apparatus, applied to a terminal device, including:

a receiving module, for receiving a higher layer signaling transmitted from a network device, where the higher layer signaling is configured with a first frequency hopping pattern or multiple candidate frequency hopping patterns; and a determining module, for determining a frequency hopping pattern for an uplink channel corresponding to the terminal device based on the higher layer signaling.

An embodiment of the present application further provides a frequency hopping indication apparatus, applied to a network side, including:

a transmitting module, for transmitting a higher layer signaling to a terminal device, where the higher layer signaling is configured with a first frequency hopping pattern or multiple candidate frequency hopping patterns.

An embodiment of the present application further provides a processor readable storage medium, where the processor readable storage medium stores a computer program for causing a processor to perform the steps of the frequency hopping indication method described above.

The frequency hopping indication methods and apparatuses provided in the embodiments of the present application enable the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

BRIEF DESCRIPTION OF THE DRAWINGS

The embodiments of the present application, a brief description is given to the accompanying drawings required in the description of the embodiments. It can be seen that, the accompanying drawings in the following description are some embodiments of the present application.

DETAILED DESCRIPTION

In the embodiments of the present application, the term "and/or" describes the association relationship of the associated objects, indicating three types of relationships. For example, A and/or B may represent three situations: A exists alone, A and B exist simultaneously, and B exists alone. The character "/" generally indicates that the associated objects are in an "or" relationship.

The term "multiple" in the embodiments of the present application refers to two or more, similar to other quantifiers.

The following provides a clear and complete description for the embodiments of the present application, in conjunction with the accompanying drawings. The described embodiments are only part of the embodiments of the present application and not all of them.

An uplink channel includes a physical uplink shared channel (PUSCH) and a physical uplink control channel (PUCCH). The PUSCH is an uplink data channel scheduled and transmitted by uplink downlink control information (DCI) format 0_X (abbreviated as DCI 0_X). DCI 0_0 and DCI 0_1 are two types of uplink DCI for scheduling PUSCH defined in Rel-15 protocol, supporting PUSCH repetition transmission mode in Rel-15. DCI 0_2 is uplink DCI for scheduling PUSCH introduced in Rel-16 protocol for ultra reliable low latency communication (URLLC) supporting two PUSCH repetition of PUSCH repetition type A and PUSCH repetition type B. PUSCH repetition Type A is a slot-based PUSCH repetition transmission mode supported in Rel-15 protocol. PUSCH repetition Type B is a mini-slot-based PUSCH repetition transmission mode introduced in Rel-16 protocol for URLLC. It should be noted that DCI 0_1 supports scheduling modes in both Rel-15 and Rel-16. PUCCH is a control channel bearing the transmission of uplink control information (UCI). Hybrid automatic repeat request-acknowledge (HARQ-ACK) is a type of UCI, used for a UE to transmit, to a base station, feedback information for indicating whether downlink data channel physical downlink shared channel (PDSCH) scheduled by downlink DCI 1_X is correctly received.

Figure 2:
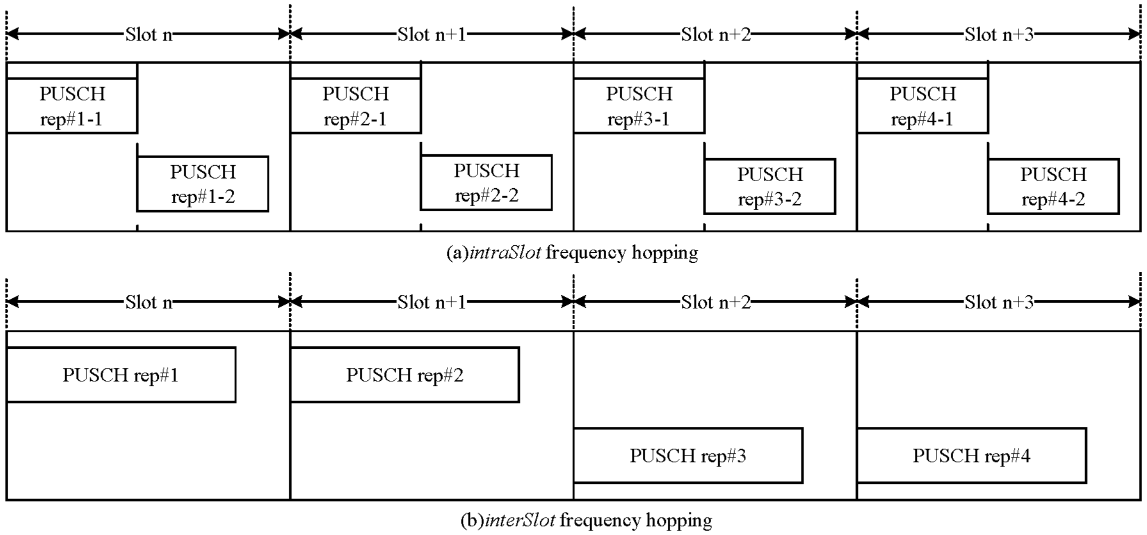
FIG. 2 is a frequency hopping schematic diagram of PUSCH repetition Type A frequency hopping pattern according to an embodiment of the present application.
Figure 3:
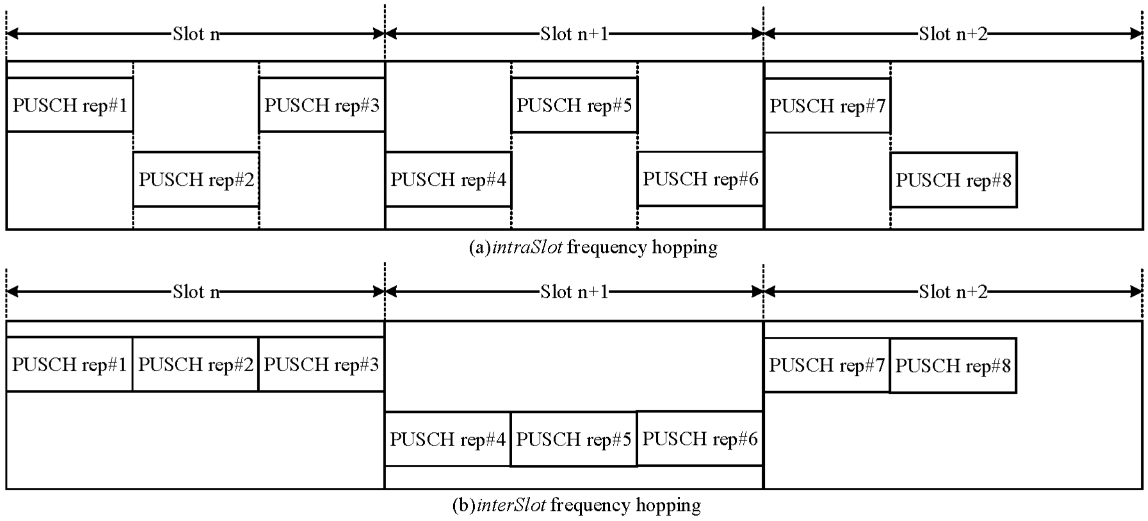
FIG. 3 is a frequency hopping schematic diagram of PUSCH repetition Type B frequency hopping pattern according to an embodiment of the present application.

In Rel-16 protocol, the uplink channel supports three frequency hopping patterns: interRepetition, interSlot, and intraSlot. The PUSCH/PUCCH that transmitted only once supports intraSlot frequency hopping; PUSCH repetition Type A supports interSlot and intraSlot frequency hopping, as shown in FIG. 2; PUSCH repetition Type B supports interRepetition and interSlot frequency hopping, as shown in FIG. 3; PUCCH repetition supports interSlot and intraSlot frequency hopping, with the same frequency hopping pattern as PUSCH repetition Type A in FIG. 2.

Figure 1:
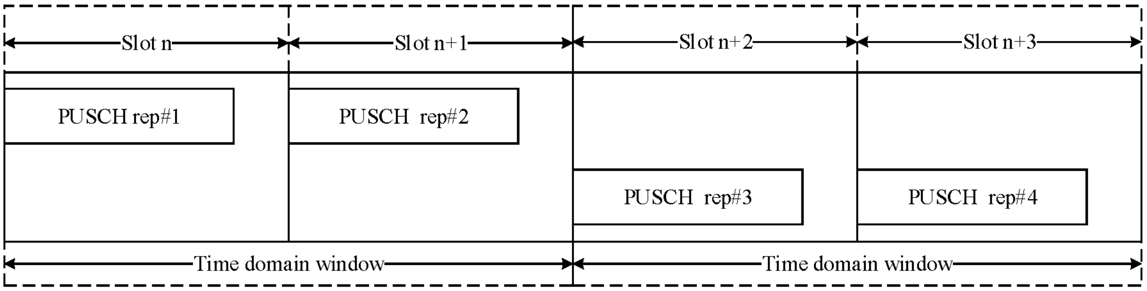
FIG. 1 is a frequency hopping schematic diagram of a first physical uplink shared channel (PUSCH) frequency hopping pattern according to the present application.

During the research of Rel-17 on coverage enhancement, a scheme is proposed to improve the uplink channel transmission performance through joint channel estimation (JCE). The prerequisites for JCE are stable power and continuous phase. The frequency hopping pattern supported in Rel-16 may disrupt phase continuity in case that changing frequency demain positions, and JCE cannot be performed in case that only one uplink channel is in each hop. Therefore, to obtain both frequency hopping gain and joint channel estimation gain simultaneously, Rel-17 further proposes a new frequency hopping pattern, namely the first frequency hopping pattern in the present application, which is a frequency hopping pattern different from the three frequency hopping patterns of interRepetition, interSlot, and intraSlot. FIG. 1 shows a schematic diagram of the frequency hopping pattern with two slots in each hop when PUSCH is repeatedly transmitted 4 times. The base station may perform JCE on the first two PUSCH and the last two PUSCH separately.

Enabling frequency hopping function for PUSCH requires collaboration between higher layer radio resource control (RRC) signaling and DCI signaling. Firstly, in case that frequencyHopping IE is configured in PUSCH-config by RRC signaling, intraSlot or interSlot are selected; in one embodiment, in case that DCI format 0_1/0_2 associated with Rel-16 functionality is configured for scheduling PUSCH repetition, the corresponding IE is configured in PUSCH-config based on the PUSCH repetition type to select the frequency hopping pattern. Then, in case that the value of the frequency hopping flag field in the scheduling DCI corresponding to the uplink channel is 1, the UE transmits the uplink channel by using the frequency hopping pattern configured by the RRC; in case that the value of the frequency hopping flag field is 0, the UE turns off the frequency hopping function and transmits the uplink channel at the same frequency domain position.

Enabling frequency hopping function for PUCCH only requires RRC signaling configuration, where intraSlot frequency hopping is configured separately for each PUCCH resource. In case that the intraSlotfrequencyHopping IE included in the PUCCH resource is configured to be enabled by RRC signaling in PUCCH-config, the PUCCH transmitted by this PUCCH resource is selected to use intraSlot frequency hopping pattern. In case that RRC defaults to configure this IE, PUCCH does not adopt frequency hopping pattern for transmission.

The interSlot frequency hopping pattern may only be enabled in case that PUCCH is repeatedly transmitted. The Rel-16 protocol stipulates that only long PUCCH, i.e., PUCCH format 1/3/4, may be transmitted using the repetition mode. Therefore, interSlot frequency hopping is configured for each PUCCH format and bound to the PUCCH format. In case that the interSlotFrequencyHopping IE included in PUCCH-FormatConfig is configured to be enabled by RRC signaling in PUCCH-config, the PUCCH transmitted by the PUCCH resource corresponding to this PUCCH format is selected to use the interSlot frequency hopping pattern. In case that RRC defaults to configure this IE, PUCCH does not adopt frequency hopping pattern for transmission.

The frequency hopping mechanism in Rel-16 may only configuring three types of frequency hopping patterns: interRepetition, interSlot, and intraSlot, and cannot support the new frequency hopping pattern proposed by Rel-17, namely the first frequency hopping pattern, which is a frequency hopping pattern different from the three types of frequency hopping patterns: interRepetition, interSlot, and intraSlot. Meanwhile, the related art adopts a semi-static configuration mode to select the frequency hopping pattern, in case of switching the frequency hopping pattern, it may only be completed through RRC reconfiguration, and flexible dynamic switching cannot be achieved.

Figure 4:
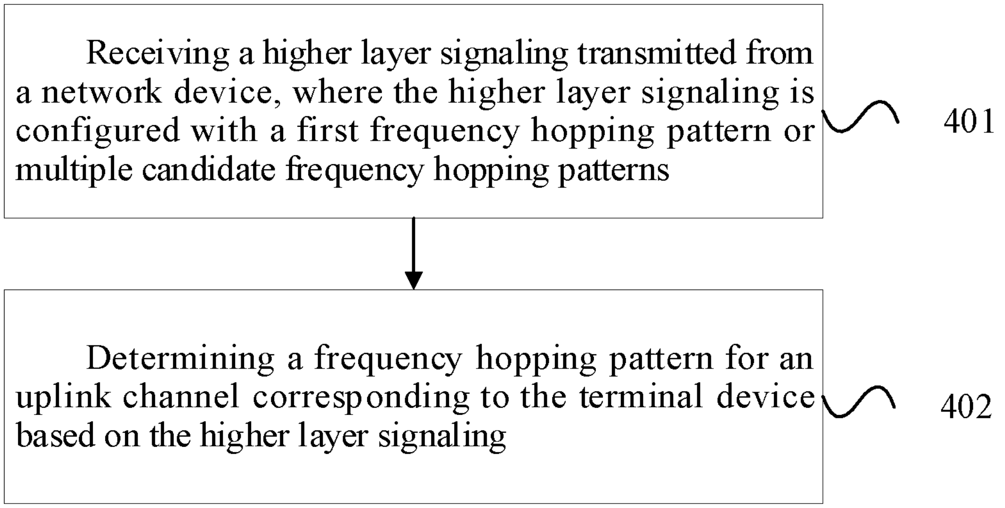
FIG. 4 is a first schematic flowchart of a frequency hopping indication method according to an embodiment of the present application.

Therefore, the embodiments of the present application are proposed, and the core concept of the present application is: higher layer signaling configures the first frequency hopping pattern directly or indirectly; in case that the higher layer signaling configures more than one frequency hopping pattern, dynamic switching of frequency hopping patterns is achieved through DCI signaling FIG. 4 is a first schematic flowchart of a frequency hopping indication method according to an embodiment of the present application. As shown in FIG. 4, an embodiment of the present application provides a frequency hopping indication method, which may be executed by a terminal device, such as a mobile phone, etc. The method includes the following steps.

Step 401: receiving a higher layer signaling transmitted from a network device, where the higher layer signaling is configured with a first frequency hopping pattern or multiple candidate frequency hopping patterns.

In an embodiment, the terminal device receives higher layer signaling transmitted from the network device, and configurations of higher layer signaling are mainly divided into two categories. One category is to configure a frequency hopping pattern, which is the first frequency hopping pattern. The first frequency hopping pattern is a frequency hopping pattern different from three frequency hopping patterns of interRepetition, interSlot, and intraSlot. And another category is to configure multiple frequency hopping patterns to switch between different frequency hopping patterns among the configured multiple frequency hopping patterns. The configuration of multiple frequency hopping patterns may have multiple manifestations, such as being configured with two or more separate frequency hopping patterns, such as {frequency hopping pattern A, frequency hopping pattern B}, or a composite configuration mode, such as {frequency hopping pattern A, frequency hopping pattern B and frequency hopping pattern C}, where frequency hopping pattern A, frequency hopping pattern B, and frequency hopping pattern C represent three different frequency hopping patterns.

Step 402: determining a frequency hopping pattern for an uplink channel corresponding to the terminal device based on the higher layer signaling.

Based on the frequency hopping pattern configured in higher layer signaling, in case that only the first frequency hopping pattern is configured, the terminal device needs to determine whether to adopt the first frequency hopping pattern. In case that multiple frequency hopping patterns are configured, the terminal device switches between multiple frequency hopping patterns by selecting one frequency hopping pattern among the multiple frequency hopping patterns.

The frequency hopping indication method provided in the embodiments of the present application enables the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

In an embodiment, in case that the uplink channel is a physical uplink shared channel (PUSCH), the method further includes:

receiving first downlink control information (DCI) transmitted from the network device;

the determining the frequency hopping pattern for the uplink channel corresponding to the terminal device based on the higher layer signaling includes:

determining the first frequency hopping pattern based on the higher layer signaling in case that the higher layer signaling is configured with the first frequency hopping pattern; and determining the first frequency hopping pattern as enabled or disabled based on the first DCI.

In an embodiment, in case that the uplink channel is PUSCH, the terminal device receives higher layer signaling transmitted from the network side. The first frequency hopping pattern may be explicitly or implicitly configured in the higher layer signaling, and the terminal device acknowledges the frequency hopping pattern supported by the network side and may be allocated to the terminal. Then, the network side transmits the first DCI to the terminal device, and the terminal device determines whether the first frequency hopping pattern is enabled based on a frequency hopping flag in the DCI, that is, the terminal device determines whether to adopt the first frequency hopping pattern.

In case that the frequency hopping flag in the DCI is 1, the terminal determines the first frequency hopping pattern as enabled, and the first frequency hopping pattern is adopted; in case that the frequency hopping flag in the DCI is 0, the terminal determines the first frequency hopping pattern as disabled, and the first frequency hopping pattern is not adopted.

The frequency hopping indication method provided in the embodiments of the present application enables the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

In an embodiment, the determining the first frequency hopping pattern includes:

determining the first frequency hopping pattern based on a first information element (IE) configured in the PUSCH configuration (PUSCH-config) by the higher layer signaling; or determining the first frequency hopping pattern based on a second IE configured in PUSCH-config by the higher layer signaling; or determining the first frequency hopping pattern based on a joint channel estimation (JCE) association configuration in the higher layer signaling, as well as an interSlot or interRepetition frequency hopping pattern configured in PUSCH-config by the higher layer signaling.

In an embodiment, the configuration mode of the first frequency hopping pattern may be configured through explicit configuration or implicit configuration, where explicit configuration of the first frequency hopping pattern mainly has two modes.

The first mode is to configure the first frequency hopping pattern based on the first IE configured in PUSCH-config by the higher layer signaling, where the first IE is the existing IE in PUSCH-config, which may configure the existing interRepetition, interSlot, and intraSlot frequency hopping patterns, as well as the first frequency hopping pattern.

The first IE mainly includes frequencyHopping IE, frequencyHoppingDCI-0-1-r16 IE, and frequencyHoppingDCI-0-2-r16 IE, where frequencyHoppingDCI-0-2-r16 IE includes pusch RepTypeA IE and pusch-RepTypeB IE.

For example, in case that Rel-15 scheduling mode is adopted, a state of frequencyHopping IE of PUSCH-config in the higher layer signaling is the first frequency hopping pattern.

In case that Rel-16 scheduling mode is adopted, a state of frequencyHoppingDCI-0-1-r16 IE or frequencyHoppingDCI-0-2-r16 IE of PUSCH-config in the higher layer signaling is the first frequency hopping pattern; in an embodiment, in frequencyHoppingDCI-0-2-r16 IE, the configuration of the first frequency hopping pattern is mainly achieved by setting the state of pusch RepTypeA IE or pusch-RepTypeB IE to the first frequency hopping pattern.

The terminal device determines its own frequency hopping behavior, i.e., the frequency hopping patterns may be adopted, based on the higher layer signaling configured with the first frequency hopping pattern.

The second mode is to configure the first frequency hopping pattern based on the second IE configured in PUSCH-config by the higher layer signaling, where the second IE is a newly added IE in PUSCH-config, which is only used to configure the first frequency hopping pattern.

In the mode of configuring the first frequency hopping pattern based on the second IE in PUSCH-config, the state of the second IE is set as enabled, which indicates that the terminal device determines that the first frequency hopping pattern of the corresponding uplink channel is enabled, and the available frequency hopping pattern is the first frequency hopping pattern.

In the present application, interBundling is used to represent the first frequency hopping pattern, but the scope of protection in the present application is not limited to the name of interBundling and the name is only for illustrative purposes.

Taking configuring the first frequency hopping pattern in the first IE by the higher layer signaling as an example, the frequencyHopping IE and pusch RepTypeA IE in PUSCH-config have three candidate values: {intraSlot, interSlot, interBundling}, and pusch-RepTypeB IE has three candidate values: {interRepetition, interSlot, interBundling}. In case that the higher layer signaling configures frequencyHopping IE as interBundling, the base station transmits the first downlink control information DCI 0_0, in case that PUSCH is scheduled by DCI 0_0 and the frequency hopping flag field value is 1, UE determines that the interBundling frequency hopping pattern is enabled, and then adopts the interBundling frequency hopping pattern to transmit PUSCH. In case that the higher layer signaling configures pusch RepTypeX IE as interBundling, the base station transmits DCI 0_2 to schedule PUSCH and the frequency hopping flag field value is 1, UE determines that the interBundling frequency hopping pattern is enabled, and then adopts the interBundling frequency hopping pattern to transmit PUSCH.

Other than explicitly configuring the first frequency hopping pattern, the first frequency hopping pattern may also be implicitly configured. The specific mode is as follows:

the higher layer signaling includes the JCE association configuration, in case that the higher layer signaling configures the interSlot frequency hopping pattern corresponding to Rel-15 protocol or the interRepetition frequency hopping pattern corresponding to Rel-16 protocol, and the JCE association configuration is configured, then it is determined that the terminal device determines that the first frequency hopping pattern for the corresponding uplink channel is enabled, then the available frequency hopping pattern is the first frequency hopping pattern.

The frequency hopping indication method provided in the embodiments of the present application enables the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

In an embodiment, in case that the uplink channel is a physical uplink control channel (PUCCH), the determining the frequency hopping pattern for the uplink channel corresponding to the terminal device based on the higher layer signaling includes:

determining the first frequency hopping pattern based on the higher layer signaling in case that the higher layer signaling is configured with the first frequency hopping pattern.

In an embodiment, in case that the uplink channel is PUCCH, the terminal device receives higher layer signaling transmitted from the network side, and the first frequency hopping pattern is explicitly or implicitly configured in the higher layer signaling.

In case that the first frequency hopping pattern is explicitly configured, the higher layer signaling received by the terminal device configures a third IE in PUCCH-config, and the third IE is used to configure the first frequency hopping pattern. That is, in case that the higher layer signaling sets a state of the third IE in PUCCH-config as enabled, it is indicated that the terminal device determines that the first frequency hopping pattern of the corresponding uplink channel is enabled, and the available frequency hopping pattern is the first frequency hopping pattern.

For example, in case that the uplink channel is PUCCH, the configuration of interBundlingfrequencyHopping IE in PUCCH-config is added. In case that the higher layer signaling sets interBundlingfrequencyHopping IE to an enabled state, it may be limited that in case that interSlotFrequencyHopping IE is also configured in PUCCH-config, the UE ignores the configuration of the interSlotFrequencyHopping IE; in one embodiment, it is limited that in case that interpBundlingfrequencyHopping IE is configured in PUCCH-config, it is not allowed to configure interpSlotfrequencyHopping IE.

In case that the first frequency hopping pattern is implicitly configured, and the higher layer signaling configures both interSlot frequency hopping pattern and JCE association configuration, the terminal device determines the first frequency hopping pattern as enabled and the frequency hopping pattern of the corresponding uplink channel may adopt the first frequency hopping pattern.

The frequency hopping indication method provided in the embodiments of the present application enables the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

Below is a description of configuring the first frequency hopping pattern by the second IE in the higher layer signaling PUSCH-config, and the configuration interBundlingfrequencyHopping IE in PUSCH-config is added. In case that the higher layer signaling configures interBundlingfrequencyHopping IE to enabled state, the base station transmits the first DCI 0_0, in case that PUSCH is scheduled by DCI 0_0 and the frequency hopping flag field value is 1, UE determines that the interBundling frequency hopping pattern is enabled, and then adopts the interBundling frequency hopping pattern to transmit PUSCH. At this point, an IE with two frequency hopping patterns configured simultaneously by higher layer signaling may occur. It may be limited that in case that frequencyHopping IE is also configured in PUSCH-config, UE will ignore the frequency hopping patterns configured in these frequencyHopping IEs; Similarly, it may also be limited that in case that interBundlingfrequencyHopping IE is configured in PUSCH-config, it is not allowed to configure frequencyHopping IE.

In case that the higher layer signaling configures interBundlingfrequencyHopping IE to disabled state or default, and the base station transmits DCI 0_0 to schedule PUSCH and the frequency Hopping flag field value is 1, UE selects the final frequency hopping pattern based on the configured frequencyHopping IE.

Taking implicitly configuring the first frequency hopping pattern through JCE association configuration in higher layer signaling, using PUSCH repetition scheduled by DCI 0_0 as an example, the higher layer signaling sets the frequencyHopping IE in PUSCH-config to interSlot state, and the UE adopts interSlot frequency hopping. The interBundling frequency hopping pattern is an enhancement of interSlot frequency hopping in a JCE scenario. In case that the higher layer signaling configures to enable the JCE function, it is defaulted that, in the JCE scenario, the corresponding interBundling frequency hopping pattern is enabled, and the interBundling frequency hopping pattern is adopted. Similarly, in case that the higher layer configures a time-domain window size or a time-domain frequency hopping interval, it is also assumed that the base station will adopt the JCE mode at a receiving end, the interBundling frequency hopping pattern of the UE is enabled, and the interBundling frequency hopping pattern should be used at a transmitting end. However, in case that a value of the time-domain window size or the time-domain frequency hopping interval is 1, even though the higher layer signaling configures the time-domain window size or the time-domain frequency hopping interval, only one PUSCH is within one time-domain window or time-domain frequency hopping interval, and JCE cannot be performed. At this point, the interSlot frequency hopping pattern of the UE in this scenario is enabled, and the interSlot frequency hopping pattern should be adopted.

Similarly, in case that PUSCH repetition Type B is scheduled by DCI 02, the higher layer signaling is required to configure the pusch-RepTypeB IE as interRepetiton. Other behaviors are the same as the above embodiments and will not be described in detail. In case that repetition Type B is adopted, and pusch-RepTypeB IE is configured as interSlot, multiple PUSCH repetitions are already in one slot, and the JCE may be directly performed without configuring interBundling frequency hopping.

For PUCCH repetition, in case that the interSlotFrequencyHopping IE is configured as enabled in PUCCH-config, UE adopts the interSlot frequency hopping pattern. The other configurations that implicitly enable interBundling frequency hopping are the same as PUSCH transmission mentioned above, and will not be described in detail in this embodiment.

In an embodiment, the JCE association configuration includes at least one of a time-domain window size, a time-domain frequency hopping interval, or a JCE enabled/disabled.

In an embodiment, in case that the first frequency hopping pattern is implicitly configured, it is a premise to configure the existing frequency hopping pattern by higher layer signaling and configuring JCE association configuration to configure the first frequency hopping pattern. And the JCE association configuration may be achieved through at least one of the time-domain window size, the time-domain frequency hopping interval, or the JCE enabled/disabled. For example, the time-domain window size is configured to 4, or the time-domain frequency hopping interval is configured to 2, or enabling JCE to complete the association configuration of JCE. The terminal device determines the available frequency hopping pattern of the corresponding uplink channel is the first frequency hopping pattern based on the above configuration. In one embodiment, in case that the value of the time-domain window size or the time-domain frequency hopping interval in the JCE association configuration is 1, the uplink channel corresponding to the terminal device is determined not to adopt the first frequency hopping pattern. The time-domain window size, configured by higher layer signaling, is a time-domain length corresponding to one JCE in case that UE performs JCE; the time-domain frequency hopping interval, configured by higher layer signaling, is a time-domain length corresponding to one JCE, i.e., one hop, in case that the UE supports JCE while frequency hopping transmission.

For example, in case that the value of the field window size or the time-domain frequency hopping interval is 1, even though the higher layer signaling configures the time-domain window size or the time-domain frequency hopping interval, only one PUCCH is within one time-domain window or time-domain frequency hopping interval, and JCE cannot be performed. The UE should adopt interSlot frequency hopping in this scenario.

The frequency hopping indication method provided in the embodiments of the present application enables the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

In an embodiment, the method further includes:

- receiving second DCI transmitted from the network device;
- the determining the frequency hopping pattern for the uplink channel corresponding to the terminal device based on the higher layer signaling includes:
- determining configured multiple candidate frequency hopping patterns based on the higher layer signaling in case that the higher layer signaling is configured with the multiple candidate frequency hopping patterns; and
- determining the frequency hopping pattern for the uplink channel corresponding to the terminal device among the multiple candidate hopping patterns based on the second DCI.

In an embodiment, in case that the higher layer signaling is configured with the multiple candidate frequency hopping patterns, the terminal device determines the candidate frequency hopping pattern for frequency hopping based on the higher layer signaling. The candidate frequency hopping patterns include at least two frequency hopping patterns, which may be configured by two or more separate frequency hopping patterns, such as {frequency hopping pattern A, frequency hopping pattern B}, or a composite configuration mode, such as {frequency hopping pattern A, frequency hopping pattern B and frequency hopping pattern C}, where frequency hopping pattern A, frequency hopping pattern B, and frequency hopping pattern C represent three different frequency hopping patterns, respectively.

After receiving the second DCI, the terminal device selects and determines, based on the DCI, the frequency hopping pattern of the uplink channel corresponding to the terminal device among the candidate frequency hopping patterns. Through this mode, the terminal device may switch between multiple frequency hopping patterns.

In the frequency hopping indication method provided in the embodiments of the present application, in case that multiple frequency hopping patterns are configured in higher layer signaling, the terminal device determines the multiple candidate frequency hopping patterns, and determines, based on the second DCI, the frequency hopping pattern of the uplink channel corresponding to the terminal device, to achieve dynamic switching between multiple frequency hopping patterns.

In an embodiment, in case that the higher layer signaling is configured with the multiple candidate frequency hopping patterns, the determining the configured multiple candidate frequency hopping patterns based on the higher layer signaling includes:

- determining the multiple candidate frequency hopping patterns based on the higher layer signaling in case that the uplink channel is a PUSCH; and
- determining the multiple candidate frequency hopping patterns based on the higher layer signaling in case that the uplink channel is a PUCCH.

In an embodiment, the uplink channel mainly includes PUSCH and PUCCH, which may both be explicitly or implicitly configured with multiple candidate frequency hopping patterns by the network side by higher layer signaling. The terminal device determines the explicitly or implicitly configured multiple candidate frequency hopping patterns based on the higher layer information. Thus, a flexible configuration of multiple frequency hopping patterns is achieved, and the terminal may select between multiple frequency hopping patterns based on this to complete the switching of different frequency hopping patterns.

In the frequency hopping indication method provided in the embodiments of the present application, in case that multiple frequency hopping patterns are configured in higher layer signaling, the terminal device determines the multiple candidate frequency hopping patterns, and determines, based on the second DCI, the frequency hopping pattern of the uplink channel corresponding to the terminal device, to achieve dynamic switching between multiple frequency hopping patterns.

In an embodiment, in case that the uplink channel is PUSCH, the determining the multiple candidate frequency hopping patterns based on the higher layer signaling includes:

- determining the multiple candidate frequency hopping patterns based on the first IE configured in PUSCH-config by the higher layer signaling; or
- determining the multiple candidate frequency hopping patterns based on the second IE configured in PUSCH-config by the higher layer signaling, where the first frequency hopping pattern among the multiple candidate frequency hopping patterns is determined based on the second IE configured in PUSCH-config by the higher layer signaling, and other frequency hopping patterns other than the first frequency hopping pattern among the multiple candidate hopping patterns are determined based on the first IE configured in PUSCH-config by the higher layer signaling; or determining the multiple candidate frequency hopping patterns including the first frequency hopping pattern based on the JCE association configuration in the higher layer signaling.

In an embodiment, in case that the uplink channel is PUSCH, the terminal device determines the available multiple candidate hopping patterns for its uplink channel based on higher layer signaling explicitly or implicitly configured with multiple candidate hopping patterns, i.e., the multiple candidate hopping patterns are enabled.

The determining multiple explicitly configured candidate frequency hopping patterns includes:

determining multiple candidate frequency hopping patterns based on the first IE configured in PUSCH-config configured by higher layer signaling, where the first IE is the existing IE in PUSCH-config, which may configure existing interRepetition, interSlot, and intraSlot frequency hopping patterns, as well as the first frequency hopping pattern. The multiple candidate frequency hopping patterns include at least two frequency hopping patterns, such as the first IE is configured with a frequency hopping pattern configured by two or more separate frequency hopping patterns, such as {frequency hopping pattern A, frequency hopping pattern B}, or a composite configuration mode, such as {frequency hopping pattern B and frequency hopping pattern C}, or {frequency hopping pattern A, frequency hopping pattern B and frequency hopping pattern C}, where frequency hopping pattern A, frequency hopping pattern B, and frequency hopping pattern C represent three different frequency hopping patterns, respectively, and any one may represent the first frequency hopping pattern.

The determining multiple candidate frequency hopping patterns based on the second IE configured in PUSCH-config by the higher layer signaling, where the first frequency hopping pattern among the multiple candidate hopping patterns is determined based on the second IE configured in PUSCH-config by the higher layer signaling, and other frequency hopping patterns other than the first frequency hopping pattern among the multiple candidate hopping patterns are determined based on the first IE configured in PUSCH-config by the higher layer signaling.

In an embodiment, the determined multiple candidate frequency hopping patterns are jointly configured by the first IE and the second IE in PUSCH-config. The second IE is a newly added IE in PUSCH-config, mainly used to configure the first frequency hopping pattern. For example, the multiple candidate hopping patterns are {first frequency hopping pattern, frequency hopping pattern B and hopping pattern C}, where the "first frequency hopping pattern" is determined based on the second IE, and the "hopping pattern B and hopping pattern C" is determined based on the first IE.

The determining multiple implicitly configured candidate frequency hopping patterns includes:

in case that one or more candidate hopping patterns is configured in the first IE configured in PUSCH-config by higher layer signaling, and JCE association configuration is configured, it is determined that multiple candidate hopping patterns of the uplink channel corresponding to the terminal device are enabled, that is, available multiple candidate hopping patterns are determined, including the first frequency hopping pattern.

The frequency hopping indication method provided in the embodiments of the present application, in case that the uplink channel is PUSCH, the multiple frequency hopping patterns are explicitly or implicitly configured in higher layer signaling. In case of explicit configuration, the first IE or second IE in PUSCH-config is adopted to complete the relevant configuration; in case of implicit configuration, the relevant configuration of multiple frequency hopping patterns is completed by combining JCE association configuration, making the mode for determining candidate multiple frequency hopping patterns more flexible for the terminal device, to achieve dynamic switching between multiple frequency hopping patterns.

In an embodiment, the determining the multiple candidate frequency hopping patterns based on the first IE configured in PUSCH-config by the higher layer signaling includes:

the determined multiple candidate frequency hopping patterns include the first frequency hopping pattern.

In an embodiment, in case that higher layer signaling determines multiple candidate hopping patterns only based on the first IE configured in PUSCH-config, the multiple candidate hopping patterns determined by the terminal device include the first frequency hopping pattern.

In an embodiment, in case that the uplink channel is PUCCH, the determining the multiple candidate frequency hopping patterns based on the higher layer signaling includes:

determining the multiple candidate frequency hopping patterns based on the third IE configured in PUCCH-config by the higher layer signaling, where the first frequency hopping pattern among the multiple candidate hopping patterns is determined based on the third IE configured in PUCCH-config by the higher layer signaling, and the other frequency hopping patterns other than the first frequency hopping pattern among the multiple candidate hopping patterns are determined based on a fourth IE configured in PUCCH-config by the higher layer signaling; or determining the multiple candidate frequency hopping patterns including the first frequency hopping pattern based on the JCE association configuration in the higher layer signaling.

In an embodiment, in case that the uplink channel is PUCCH, the terminal device determines the multiple candidate hopping patterns of its uplink channel is enabled based on higher layer signaling explicitly or implicitly configured with multiple candidate hopping patterns, that is, the available multiple candidate hopping patterns are determined.

The determining multiple explicitly configured candidate frequency hopping patterns refers to determining multiple candidate frequency hopping patterns including the first frequency hopping pattern through the third IE configured in PUCCH-config by higher layer signaling. And the first frequency hopping pattern is determined based on the third IE configured in PUCCH-config by the higher layer signaling. The existing frequency hopping pattern is determined based on the fourth IE configured in PUCCH-config by the higher layer signaling.

The determining multiple implicitly configured candidate frequency hopping patterns refers to, in case that multiple candidate frequency hopping patterns are configured in the fourth IE configured in PUCCH-config by higher layer signaling, and JCE association configuration is configured, it is determined that multiple candidate frequency hopping patterns of the uplink channel corresponding to the terminal device are enabled, i.e., the available multiple candidate frequency hopping patterns are determined, which include the first frequency hopping pattern.

The frequency hopping indication method provided in the embodiments of the present application, in case that the uplink channel is PUCCH, the multiple frequency hopping patterns are explicitly or implicitly configured in higher layer signaling. In case of explicit configuration, the third IE in PUCCH-config is adopted to complete the relevant configuration; in case of implicit configuration, the relevant configuration of multiple frequency hopping patterns is completed by combining JCE association configuration, making the mode for determining candidate multiple frequency hopping patterns more flexible for the terminal device, to achieve dynamic switching between multiple frequency hopping patterns.

In an embodiment, the JCE association configuration includes at least one of a time-domain window size, a time-domain frequency hopping interval, or a JCE enabled/disabled.

In an embodiment, in case that the first frequency hopping pattern is implicitly configured, it is a premise to configure the existing frequency hopping pattern by higher layer signaling and configuring JCE association configuration to configure the first frequency hopping pattern. And the JCE association configuration may be achieved through at least one of the time-domain window size, the time-domain frequency hopping interval, or the JCE enabled/disabled. For example, the time-domain window size is configured to 4, or the time-domain frequency hopping interval is configured to 2, or enabling JCE to complete the association configuration of JCE. The terminal device determines that the first frequency hopping pattern of its corresponding uplink channel is enabled. That is, determining the available frequency hopping pattern as the first frequency hopping pattern. In one embodiment, in case that the value of the time-domain window size or the time-domain frequency hopping interval in the JCE association configuration is 1, the first frequency hopping pattern of the uplink channel corresponding to the terminal device is determined as disabled, that is, it is determined not to adopt the first frequency hopping pattern.

For example, in case that the value of the field window size or the time-domain frequency hopping interval is 1, even though the higher layer signaling configures the time-domain window size or the time-domain frequency hopping interval, only one PUCCH is within one time-domain window or time-domain frequency hopping interval, and JCE cannot be performed. Thus, the interSlot frequency hopping pattern of the UE in this scenario is enabled, and the interSlot frequency hopping pattern should be adopted.

The frequency hopping indication method provided in the embodiments of the present application adopts the mode of configuring JCE association configurations in case that multiple frequency hopping patterns are implicitly configured in higher layer signaling, and may complete the relevant configuration of JCE through any or a combination of the time-domain window size, time-domain frequency hopping interval, and JCE enabled/disabled, to improve the flexibility of configuration.

In an embodiment, the second DCI includes at least one of uplink DCI for scheduling PUSCH or downlink DCI for scheduling PDSCH corresponding to HARQ-ACK transmitted on PUCCH.

In an embodiment, the received second DCI may be uplink DCI scheduling PUSCH, or downlink DCI scheduling PDSCH corresponding to the HARQ-ACK transmitted on PUCCH, both of which may achieve the selection of the final hopping pattern among multiple candidate hopping patterns.

In an embodiment, the determining the frequency hopping pattern for the uplink channel corresponding to the terminal device based on the second DCI includes:

determining the frequency hopping pattern for the uplink channel corresponding to the terminal device based on a first indication field in the second DCI, where a state value of the first indication field corresponds one-to-one with the frequency hopping pattern; or determining the frequency hopping pattern for the uplink channel corresponding to the terminal device based on an expanded frequency hopping flag field in the second DCI, where a state value of the expanded frequency hopping flag field corresponds one-to-one with the frequency hopping pattern; or determining the first frequency hopping pattern for the uplink channel corresponding to the terminal device based on the frequency hopping flag field in the second DCI, where a state value of the frequency hopping flag field corresponds one-to-one with the frequency hopping pattern.

In an embodiment, multiple candidate hopping patterns may have multiple manifestations, such as a frequency hopping pattern configured by two or more separate frequency hopping patterns, such as {frequency hopping pattern A, frequency hopping pattern B}, or a composite configuration mode, such as {frequency hopping pattern B and frequency hopping pattern C}, or {hopping pattern A, frequency hopping pattern B and hopping pattern C}, where frequency hopping pattern A, frequency hopping pattern B, and frequency hopping pattern C represent three different frequency hopping patterns, respectively, and any one may represent the first frequency hopping pattern.

The terminal device selects the frequency hopping pattern of its corresponding uplink channel from multiple candidate hopping patterns based on the second DCI, as follows:

base on the first indication field in the second DCI, the first indication field is different from the existing indication bit in the second DCI, and each of the state values in the first indication field corresponds one-to-one with the frequency hopping pattern, different state values are selected, that is, which one or more hopping patterns is enabled for the corresponding uplink channel is determined, and which one or more hopping patterns may be adopted; for example, in case that the first indication field is the first candidate value, the terminal adopts the first frequency hopping pattern; in case that the first indication field is the second candidate value, the terminal adopts the second frequency hopping pattern; and so on;

in one embodiment, based on the expanded frequency hopping flag field in the second DCI, and the state value of the expanded frequency hopping flag field corresponds one-to-one with the frequency hopping pattern, the hopping pattern for the corresponding uplink channel of the terminal is determined. For example, expanding to 2 bits corresponds to 4 state values, with each frequency hopping pattern corresponds to a state value, and a hopping off state corresponds to a state value;

in one embodiment, based on the frequency hopping flag field in the second DCI, and the state value of the frequency hopping flag field corresponds one-to-one with the frequency hopping pattern, the hopping pattern for the corresponding uplink channel of the terminal is determined. Reparsing the state value of the frequency hopping flag field in the second DCI. In case that the state value is 0, the first frequency hopping pattern of the terminal device is enabled, and the first frequency hopping pattern may be adopted; in case that the state value is 1, the second frequency hopping pattern of the terminal device is enabled, and the second frequency hopping pattern may be adopted.

The frequency hopping indication method provided in the embodiments of the present application determines the frequency hopping pattern for the uplink channel corresponding to the terminal device through the state value in the second DCI in case that multiple frequency hopping patterns are configured in higher layer signaling. The state value of the second DCI may be determined by using the first indication field in the second DCI, the expanded frequency hopping flag field, or reparsing the frequency hopping flag field. Different state values in each of the fields correspond to different frequency hopping patterns, to achieve the selection of frequency hopping patterns by selecting different state values.

Taking two candidate frequency hopping patterns are configured for higher layer signaling as an example for description. The configuration mode may be based on any of the three modes: the first IE, the second/third IE, or implicitly determined based on the JCE configuration. For example, configuration based on the first IE is only applicable to PUSCH, the candidate values for frequencyHopping IE in PUSCH-config are expanded to {intraSlot, interSlot, interBundling, interSlot and interBundling}. In case that the higher layer signaling configures the frequencyHopping IE with interSlot and interBundling state, UE has two candidate frequency hopping patterns. In addition, the two candidate frequency hopping patterns may also be expanded to any combination of two frequency hopping patterns.

Configuration based on the second/third IE is applicable to PUSCH/PUCCH, the higher layer signaling configures interBundlingfrequencyHopping IE to enabled state, and another candidate frequency hopping pattern is interSlot frequency hopping pattern. In addition, another frequency hopping pattern may also be other frequency hopping patterns.

Determining implicitly based on JCE configuration is applicable to PUSCH/PUCCH. Due to the implicit premise that the first IE in the higher layer signaling configures interSlot or interRepetition frequency hopping, in addition to interBundling frequency hopping, another candidate frequency hopping pattern is interSlot or interRepetition.

Assuming that the higher layer signaling configures interSlot frequency hopping and interBundling frequency hopping for PUSCH repetition Type A. The first indication field in the second DCI for scheduling PUSCH indicates the frequency hopping pattern, such as a new 1-bit field is added in DCI 0_2 to indicate the hopping pattern. In case that the frequency hopping flag is 1 and the bit field value is 0, the interSlot frequency hopping pattern of the UE is enabled, then the interSlot frequency hopping pattern is adopted; in case that the bit field value is 1, the interBundling frequency hopping pattern of UE is enabled, then the interBundling frequency hopping pattern is adopted, and vice versa. In case that frequency hopping flag is 0 and the corresponding frequency hopping pattern of UE is disabled, PUSCH is not transmitted using frequency hopping pattern.

Similarly, a 1-bit indication field may correspond to any two frequency hopping patterns; in one embodiment, a 2-bit indication field may be added to DCI 0_2 for scheduling PUSCH to indicate the frequency hopping pattern, corresponding to intraSlot frequency hopping, interSlot frequency hopping, and interBundling frequency hopping, respectively. Similarly, for other PUSCH repetitions and PUCCH repetitions, N bits may be added to the scheduling DCI to dynamically switch frequency hopping patterns.

In response to the expanded frequency hopping flag field in the second DCI, the higher layer signaling PUSCH repetition Type A is configured with interSlot and interBundling frequency hopping patterns. The second DCI for scheduling PUSCH, such as the frequency hopping flag field in DCI 02 is expanded to 2 bits. In case that the frequency hopping flag is 00, the corresponding frequency hopping pattern of the UE is disabled, then PUSCH is not transmitted using frequency hopping; in case that frequency hopping flag is 01, and the interSlot frequency hopping pattern of the UE is enabled, then the interSlot frequency hopping pattern is adopted; in case that the frequency hopping flag is 10 and the interBundling frequency hopping pattern of the UE is enabled, then the interBundling frequency hopping pattern is adopted; the remaining frequency hopping flag being 11 is used as the reserved value (or indicating the UE to adopt intraSlot pattern). Four candidate values correspond to the four states mentioned above, and other corresponding modes are acceptable. Similarly, for other PUSCH repetitions and PUCCH repetitions, the frequency hopping flag in the scheduling DCI may be expanded to 2 bits to indicate different hopping behaviors.

To reparse the frequency hopping flag field in the second DCI, the higher layer signaling PUSCH repetition Type A is configured with interSlot and interBundling frequency hopping patterns. Reparsing the frequency hopping flag field in the DCI 0_2 for scheduling PUSCH to indicate different hopping behaviors. In case that frequency hopping flag is 0, the interSlot frequency hopping pattern of UE is enabled, and the interSlot frequency hopping pattern is adopted; in case that frequency hopping flag is 1, the interBundling frequency hopping pattern of the UE is enabled, and the interBundling frequency hopping pattern is adopted. In this embodiment, the UE is unable to turn off the frequency hopping function. Similarly, for other PUSCH repetitions and PUCCH repetitions, the frequency hopping flag field may be reparsed to indicate different frequency hopping behaviors.

Figure 5:
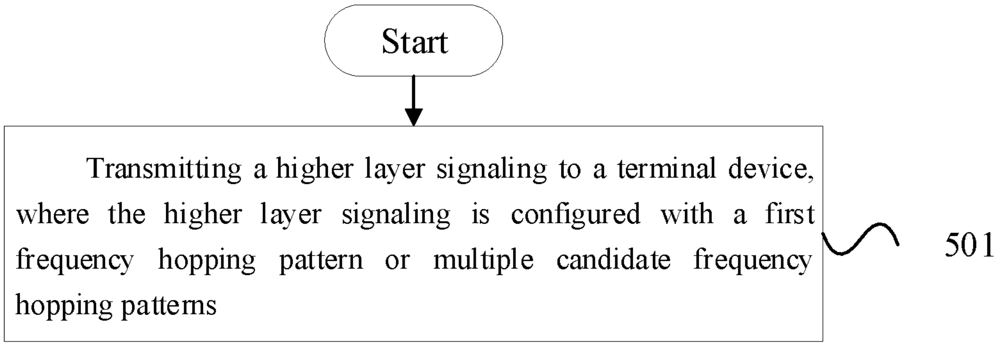
FIG. 5 is a second schematic flowchart of a frequency hopping indication method according to an embodiment of the present application.

FIG. 5 is a second schematic flowchart of a frequency hopping indication method according to an embodiment of the present application. As shown in FIG. 5, the embodiments of the present application provide a frequency hopping indication method, applied to a network side device, including the following steps.

Step 501: transmitting a higher layer signaling to a terminal device, where the higher layer signaling is configured with a first frequency hopping pattern or multiple candidate frequency hopping patterns.

In an embodiment, the network side device configures one frequency hopping pattern or multiple candidate frequency hopping patterns by higher layer signaling, and transmits the higher layer signaling to the terminal device. Thus, based on the higher layer signaling, the terminal device determines which one or more frequency hopping patterns of its corresponding uplink channel are enabled, and then adopts the enabled frequency hopping pattern. In case of configuring one frequency hopping pattern, the frequency hopping pattern is the first frequency hopping pattern. In case of configuring multiple frequency hopping patterns, the first frequency hopping pattern may be included.

The frequency hopping indication method provided in the embodiments of the present application achieves the determination of the first frequency hopping pattern for the uplink channel based on the higher layer signaling by configuring the newly added first frequency hopping pattern in the higher layer signaling by the network side; in case of configuring multiple frequency hopping patterns in higher layer signaling, the uplink channel corresponding to the terminal device may dynamically switch between multiple frequency hopping patterns.

In an embodiment, in case that the uplink channel is a physical uplink shared channel (PUSCH), the transmitting higher layer signaling to the terminal device includes:

transmitting higher layer signaling to the terminal device and configuring the first frequency hopping pattern;

after the transmitting higher layer signaling to the terminal device, the method further includes:

transmitting first downlink control information (DCI) to the terminal device; and indicating the first frequency hopping pattern of the terminal device as enabled or disabled based on the first DCI.

In an embodiment, in case that the uplink channel is PUSCH, the corresponding higher layer signaling may explicitly or implicitly configure the first frequency hopping pattern, and transmits the first DCI to the terminal device, for the terminal device to determine the corresponding uplink channel using the first frequency hopping pattern based on the higher layer signaling, and determine whether the first frequency hopping pattern is enabled based on the first DCI, i.e., determine whether to or not to adopt the first frequency hopping pattern. For example, in case that the frequency hopping flag in the first DCI is 1, the first frequency hopping pattern of the terminal device is enabled, and the first frequency hopping pattern is adopted; in case that the frequency hopping flag in the first DCI is 0, the first frequency hopping pattern of the terminal device is disabled, and the terminal device does not perform frequency hopping, that is, does not adopt the first frequency hopping pattern.

The frequency hopping indication method provided in the embodiments of the present application achieves the determination of the first frequency hopping pattern for the uplink channel based on the higher layer signaling by configuring the newly added first frequency hopping pattern in the higher layer signaling by the network side; in case of configuring multiple frequency hopping patterns in higher layer signaling, the uplink channel corresponding to the terminal device may dynamically switch between multiple frequency hopping patterns.

In an embodiment, configuring the first frequency hopping pattern includes:

configuring the first frequency hopping pattern based on a first information element (IE) configured in PUSCH-config by the higher layer signaling; or configuring the first frequency hopping pattern based on a second IE configured in PUSCH-config by the higher layer signaling; or configuring the first frequency hopping pattern based on a joint channel estimation (JCE) association configuration in the higher layer signaling, as well as an interSlot or interRepetition frequency hopping pattern configured in PUSCH-config by the higher layer signaling.

In an embodiment, the network side may configure the first frequency hopping pattern explicitly or implicitly, and the corresponding implementation methods are as follows.

Two main modes for explicitly configuring the first frequency hopping pattern are as follows.

Mode 1: configuring the first frequency hopping pattern through the first IE configured in PUSCH-config configured by higher layer signaling, where the first IE is the existing IE in PUSCH-config, which may configure existing interRepetition, interSlot, and intraSlot frequency hopping patterns, as well as the first frequency hopping pattern.

For example, in case that PUSCH repetition Type A is adopted, the frequencyHopping IE or pusch RepTypeA IE state of PUSCH-config in the higher layer signaling is the first frequency hopping pattern;

in case that PUSCH repetition Type B is adopted, the pusch-RepTypeB IE state of PUSCH-config in the higher layer signaling is the first frequency hopping pattern.

Mode 2: configuring the first frequency hopping pattern through the second IE configured in PUSCH-config configured by higher layer signaling, where the second IE is the newly added IE in PUSCH-config.

For example, setting the IE state of the second information element configured in PUSCH-config for higher layer signaling as enabled, and configuring the first frequency hopping pattern for higher layer signaling.

In case that the first frequency hopping pattern is implicitly configured, it is mainly achieved through the JCE association configuration in the higher layer signaling. That is, in case that the higher layer signaling configures the interSlot frequency hopping pattern or interRepetition frequency hopping pattern and the JCE association configuration is configured, the PUSCH corresponding to the terminal device adopts the first frequency hopping pattern.

Correspondingly, in case that the uplink channel is a physical uplink control channel (PUCCH), the network device may also configure the first frequency hopping pattern explicitly or implicitly and transmit to the terminal device.

The first frequency hopping pattern is explicitly configured mainly through the third IE configured in PUCCH-config by higher layer signaling; the third IE is the newly added IE in PUCCH-config. For example, the third IE state configured in PUCCH-config by the higher layer signaling is set as enabled, then the higher layer signaling configures the first frequency hopping pattern.

The first frequency hopping pattern is implicitly configured mainly achieved through the JCE association configuration in the higher layer signaling, that is, in case that the higher layer signaling configures the interSlot frequency hopping pattern and the JCE association configuration, the terminal adopts the first frequency hopping pattern.

The frequency hopping indication method provided in the embodiments of the present application achieves the determination of the first frequency hopping pattern for the uplink channel based on the higher layer signaling by configuring the newly added first frequency hopping pattern in the higher layer signaling by the network side; and explicitly configuring the first frequency hopping pattern through the first IE or the second/third IE in higher layer signaling, and implicitly configuring the first frequency hopping pattern through JCE association configuration.

In an embodiment, the JCE association configuration includes at least one of a time-domain window size, a time-domain frequency hopping interval, or a JCE enabled/disabled.

In an embodiment, in case that the first frequency hopping pattern is implicitly configured by the network side, it is necessary to use JCE association configurations. And JCE association configuration may be achieved through at least one of the time-domain window size, the time-domain frequency hopping interval, or the JCE enabled/disabled. For example, the time-domain window size is configured to 4, or the time-domain frequency hopping interval is configured to 2, or enabling JCE to complete the association configuration of JCE. The terminal device determines that the available frequency hopping pattern of its corresponding uplink channel is the first frequency hopping pattern. In one embodiment, in case that the value of the time-domain window size or the time-domain frequency hopping interval in the JCE association configuration is 1, the uplink channel corresponding to the terminal device is determined not to adopt the first frequency hopping pattern.

For example, in case that the value of the field window size or the time-domain frequency hopping interval is 1, although the higher layer signaling configures a time-domain window size or time-domain frequency hopping interval, the frequency hopping pattern and interSlot frequency hopping pattern are the same. The terminal device UE should use interSlot frequency hopping pattern.

The frequency hopping indication method provided in the embodiments of the present application enables the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

In an embodiment, the transmitting higher layer signaling to the terminal device includes:

- transmitting higher layer signaling to the terminal device, where the higher layer signaling is configured with multiple candidate frequency hopping patterns;
- after the transmitting higher layer signaling to the terminal device, the method further includes:
- transmitting second DCI to the terminal device; and
- indicating the terminal device to determine a frequency hopping pattern for the corresponding uplink channel among the multiple candidate hopping patterns based on the second DCI.

In an embodiment, in case that multiple candidate hopping patterns are configured by the network side, the terminal device determines multiple candidate hopping patterns based on the higher layer signaling. The network device transmits second DCI to the terminal device, and the terminal device selects the frequency hopping pattern of its corresponding uplink channel based on the DCI among the candidate hopping patterns. Through this mode, the terminal device may switch between multiple frequency hopping patterns.

The frequency hopping indication method provided in the embodiments of the present application enables the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

In an embodiment, the transmitting higher layer signaling to the terminal device, where the higher layer signaling is configured with multiple candidate frequency hopping patterns includes:

- in case that the uplink channel is PUSCH, configuring multiple candidate frequency hopping patterns based on the higher layer signaling;
- in case that the uplink channel is PUCCH, configuring multiple candidate frequency hopping patterns based on the higher layer signaling.

In an embodiment, the uplink channel mainly includes PUSCH and PUCCH, which may be configured with the multiple candidate frequency hopping patterns by higher layer signaling, explicitly or implicitly.

In case that the uplink channel is PUSCH, multiple candidate frequency hopping modes may be explicitly configured as follows.

Mode 1: configuring multiple candidate frequency hopping patterns through the first IE configured in PUSCH-config configured by higher layer signaling, where the first IE is the existing IE in PUSCH-config.

Multiple candidate hopping patterns include two or more frequency hopping patterns, such as a frequency hopping pattern configured by two or more separate frequency hopping patterns is configured in the first IE, such as {frequency hopping pattern A, frequency hopping pattern B}, or a composite configuration mode, such as {frequency hopping pattern B and frequency hopping pattern C}, or {hopping pattern A, frequency hopping pattern B and hopping pattern C}, where frequency hopping pattern A, frequency hopping pattern B, and frequency hopping pattern C represent three different frequency hopping patterns, respectively, and any one may represent the first frequency hopping pattern. That is, multiple candidate frequency hopping patterns configured through the first IE in the higher layer signaling PUSCH-config may or may not include the first frequency hopping pattern.

Mode 2: configuring the first frequency hopping pattern through the second IE configured in PUSCH-config configured by higher layer signaling, where the second IE is the newly added IE in PUSCH-config.

The first frequency hopping pattern among the multiple candidate hopping patterns is determined based on the second IE configured in PUSCH-config of the higher layer signaling, and other frequency hopping patterns other than the first frequency hopping pattern among the multiple candidate hopping patterns are determined based on the first IE configured in PUSCH-config of the higher layer signaling.

The determined multiple candidate hopping patterns are jointly configured by the first IE and the second IE configured in PUSCH-config by the higher layer signaling. For example, the multiple candidate hopping patterns are {first frequency hopping pattern, frequency hopping pattern B and hopping pattern C}, where the "first frequency hopping pattern" is determined based on the second IE configured in PUSCH-config by the higher layer signaling, and the "frequency hopping pattern B and hopping pattern C" is determined based on the first IE in the higher layer signaling PUSCH-config.

The implementation mode of implicitly configuring multiple candidate frequency hopping patterns includes:

- in case that the first IE configured in PUSCH-config by higher layer signaling is configured with one or more candidate frequency hopping patterns, and the JCE association configuration is configured, then the available multiple candidate frequency hopping patterns for the uplink channel corresponding to the terminal device are determined, and the available multiple candidate frequency hopping patterns includes the first frequency hopping pattern.

Correspondingly, in case that the uplink channel is a physical uplink control channel (PUCCH), the network device may also configure multiple frequency hopping patterns explicitly or implicitly and transmit to the terminal device.

In case that multiple frequency hopping patterns are explicitly configured, the first frequency hopping pattern is mainly by the third IE configured in PUCCH-config by the higher layer signaling; for example, setting the IE state of the third IE configured in PUCCH-config by higher layer signaling as enabled, and the first frequency hopping pattern is configured by the higher layer signaling; the other frequency hopping patterns other than the first frequency hopping pattern among the multiple candidate hopping patterns are determined based on the fourth IE configured in PUCCH-config by the higher layer signaling.

The first frequency hopping pattern is implicitly configured mainly achieved through the JCE association configuration in the higher layer signaling, that is, in case that the higher layer signaling configures the interSlot frequency hopping pattern and the JCE association configuration, the terminal adopts the first frequency hopping pattern.

The frequency hopping indication method provided in the embodiments of the present application achieves the determination of the first frequency hopping pattern for the uplink channel based on the higher layer signaling by configuring the newly added first frequency hopping pattern in the higher layer signaling by the network side; and explicitly configuring the first frequency hopping pattern through the first IE or the second/third IE in higher layer signaling, and implicitly configuring the first frequency hopping pattern through JCE association configuration.

In an embodiment, the JCE association configuration includes at least one of a time-domain window size, a time-domain frequency hopping interval, or a JCE enabled/disabled.

In an embodiment, in case that the first frequency hopping pattern is implicitly configured by the network side, it is necessary to use JCE association configurations. And JCE association configuration may be achieved through at least one of the time-domain window size, the time-domain frequency hopping interval, or the JCE enabled/disabled. For example, the time-domain window size is configured to 4, or the time-domain frequency hopping interval is configured to 2, or enabling JCE to complete the association configuration of JCE. In case that the terminal device determines that the first frequency hopping pattern of its corresponding uplink channel is enabled, the available frequency hopping pattern is the first frequency hopping pattern. In one embodiment, in case that the value of the time-domain window size or the time-domain frequency hopping interval in the JCE association configuration is 1, the first frequency hopping pattern of the uplink channel corresponding to the terminal device is determined as disabled, and the first frequency hopping pattern is not adopted.

For example, in case that the value of the field window size or the time-domain frequency hopping interval is 1, although the higher layer signaling configures the time-domain window size or time-domain frequency hopping interval, the corresponding frequency hopping pattern and interSlot frequency hopping pattern are the same. The terminal device UE should use interSlot frequency hopping pattern.

The frequency hopping indication method provided in the embodiments of the present application enables the determination of the first frequency hopping pattern for the uplink channel based on the higher layer signaling by configuring the newly added first frequency hopping pattern in the higher layer signaling; in case that multiple frequency hopping patterns in higher layer signaling are configured, multiple frequency hopping patterns are dynamically switched.

In an embodiment, the second DCI includes at least one of uplink DCI for scheduling PUSCH or downlink DCI for scheduling PDSCH corresponding to HARQ-ACK transmitted on PUCCH.

In an embodiment, the second DCI transmitted from the network side may be uplink DCI scheduling PUSCH, or downlink DCI scheduling PDSCH corresponding to the HARQ-ACK transmitted on PUCCH, both of which may achieve the selection of the final hopping pattern among multiple candidate hopping patterns.

In an embodiment, indicating the terminal device to determine the frequency hopping pattern for the corresponding uplink channel based on the second DCI includes:

- indicating the terminal device to determine the frequency hopping pattern for the corresponding uplink channel based on a first indication field in the second DCI, where a state value of the first indication field corresponds one-to-one with the frequency hopping pattern; or
- indicating the terminal device to determine the frequency hopping pattern for the corresponding uplink channel based on an expanded frequency hopping flag field in the second DCI, where a state value of the expanded frequency hopping flag field corresponds one-to-one with the frequency hopping pattern; or
- indicating the terminal device to determine the frequency hopping pattern for the corresponding uplink channel based on a frequency hopping flag field in the second DCI, where a state value of the frequency hopping flag field corresponds one-to-one with the frequency hopping pattern.

In an embodiment, multiple candidate hopping patterns may have multiple manifestations, such as a frequency hopping pattern configured by two or more separate frequency hopping patterns, such as {frequency hopping pattern A, frequency hopping pattern B}, or a composite configuration mode, such as {frequency hopping pattern B and frequency hopping pattern C}, or {hopping pattern A, frequency hopping pattern B and hopping pattern C}, where frequency hopping pattern A, frequency hopping pattern B, and frequency hopping pattern C represent three different frequency hopping patterns, respectively, and any one may represent the first frequency hopping pattern.

The network device configures the second DCI, and the terminal device may select the frequency hopping pattern of its corresponding uplink channel based on the second DCI among multiple candidate hopping patterns.

- based on the first indication field in the second DCI, where each of the state values of the first indication field corresponds one-to-one with the frequency hopping pattern, different state values are selected, that is, which one or more hopping patterns are enabled for the corresponding uplink channel is determined, and which one or more hopping patterns may be adopted is determined; for example, in case that the first indication field is the first candidate value, the terminal adopts the first frequency hopping pattern; in case that the first indication field is the second candidate value, the terminal adopts the second frequency hopping pattern; and so on;
- in one embodiment, expanding the frequency hopping flag field in the second DCI, and the state value of the expanded frequency hopping flag field corresponds one-to-one with the frequency hopping pattern. For example, expanding to 2 bits corresponds to 4 state values, with each frequency hopping pattern corresponding to a state value, and the hopping off state corresponding to a state value;

in one embodiment, in the frequency hopping flag field the second DCI, redefine the state value of the frequency hopping flag field, and the state value of the frequency hopping flag field corresponds one-to-one with the frequency hopping pattern. For example, in case that the state value of the frequency hopping flag field in the second DCI is 0, the first frequency hopping pattern of the terminal device is enabled, and the first frequency hopping pattern is adopted; in case that the state value is 1, the second frequency hopping pattern of the terminal device is enabled, and the second frequency hopping pattern is adopted.

The frequency hopping indication method provided in the embodiments of the present application determines the frequency hopping pattern for the uplink channel corresponding to the terminal device through the state value in the second DCI in case that multiple frequency hopping patterns are configured in higher layer signaling. The state value of the second DCI may be determined by using the first indication field in the second DCI, the expanded frequency hopping flag field, or reparsing the frequency hopping flag field. Different state values in each of the fields correspond to different frequency hopping patterns, to achieve the selection of frequency hopping patterns by selecting different state values.

It should be noted that in the present application, to illustrate the frequency hopping indication method, specific embodiments applied to terminal devices are also applicable to network side devices and may achieve the same effect, and will not be repeated here.

Figure 6:
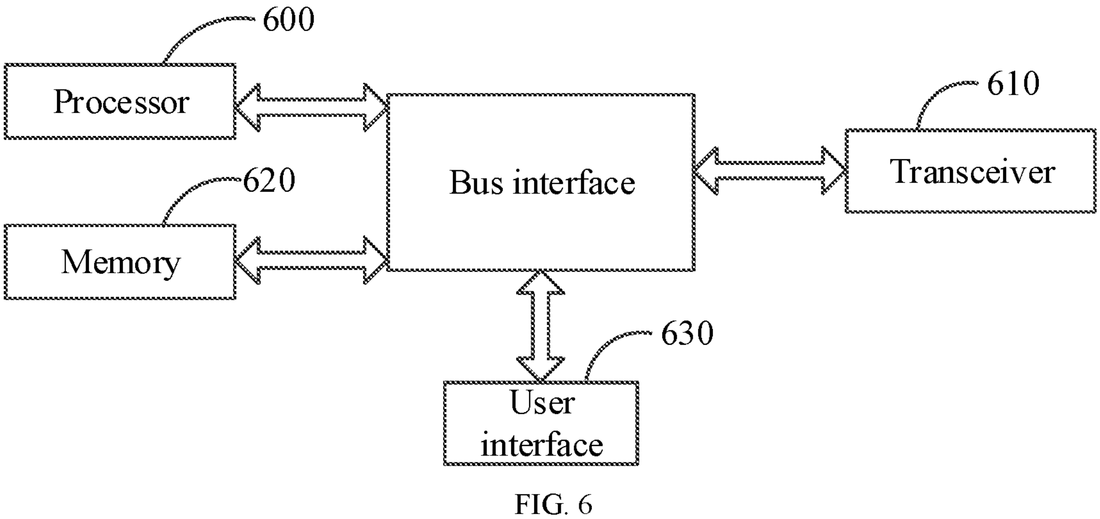
FIG. 6 is a schematic structural diagram of a terminal device according to an embodiment of the present application.

FIG. 6 is a schematic structural diagram of a terminal device according to an embodiment of the present application, As shown in FIG. 6, the terminal includes a memory 620, a transceiver 610, and a processor 600, where the processor 600 and the memory 620 may also be arranged physically separately.

The memory 620 is configured for storing a computer program; the transceiver 610 is configured for transmitting and receiving data under control of the processor 600.

In an embodiment, the transceiver 610 is configured for receiving and transmitting data under the control of the processor 600.

In FIG. 6, the bus architecture may include any number of interconnected buses and bridges, which are connected together by one or more processors represented by the processor 600 and various circuits of memory represented by the memory 620. The bus architecture may also link various other circuits such as peripherals, voltage regulators, and power management circuits, which are all well known in the art and therefore will not be described further herein. The bus interface provides an interface. The transceiver 610 may be multiple elements, including a transmitter and a receiver, providing a device for communicating with various other devices over transmission media, including wireless channels, wired channels, optical cables, and other transmission media. For different user equipments, the user interface 630 may also be an interface that may connect external and internal devices, including but not limited to small keyboards, displays, speakers, microphones, joysticks, etc.

The processor 600 is configured for managing the bus architecture and general processing, and the memory 600 can store data used by the processor 620 when performing operations The processor 600 may be a central processing unit (CPU), an application specific integrated circuit (ASIC), a field-programmable gate array (FPGA) or a complex programmable logic device (CPLD), the processor can also adopt a multi-core architecture The processor 600 is configured for executing any of the methods provided in the embodiments of the present application by calling the computer program stored in the memory 620, in accordance with the obtained executable instructions, such as:

receiving a higher layer signaling transmitted from a network device, where the higher layer signaling is configured with a first frequency hopping pattern or multiple candidate frequency hopping patterns; and determining a frequency hopping pattern for an uplink channel corresponding to the terminal device based on the higher layer signaling.

In an embodiment, in case that the uplink channel is a physical uplink shared channel (PUSCH), the steps further include:

receiving first downlink control information (DCI) transmitted from the network device;

the determining the frequency hopping pattern for the uplink channel corresponding to the terminal device based on the higher layer signaling includes:

determining the first frequency hopping pattern based on the higher layer signaling in case that the higher layer signaling is configured with the first frequency hopping pattern; and determining the first frequency hopping pattern as enabled or disabled based on the first DCI.

In an embodiment, the determining the first frequency hopping pattern includes:

determining the first frequency hopping pattern based on a first information element (IE) configured in PUSCH-config by the higher layer signaling; or determining the first frequency hopping pattern based on a second IE configured in PUSCH-config by the higher layer signaling; or determining the first frequency hopping pattern based on a joint channel estimation (JCE) association configuration in the higher layer signaling, as well as an interSlot or interRepetition frequency hopping pattern configured in PUSCH-config by the higher layer signaling.

In an embodiment, in case that the uplink channel is a physical uplink control channel (PUCCH), the determining the frequency hopping pattern for the uplink channel corresponding to the terminal device based on the higher layer signaling includes:

determining the first frequency hopping pattern based on the higher layer signaling in case that the higher layer signaling is configured with the first frequency hopping pattern.

In an embodiment, the determining the first frequency hopping pattern includes:

determining the first frequency hopping pattern based on a third IE configured in PUCCH-config by the higher layer signaling; or determining the first frequency hopping pattern based on the JCE association configuration in the higher layer signaling, as well as an interSlot frequency hopping pattern configured in PUCCH-config by the higher layer signaling.

In an embodiment, the JCE association configuration includes at least one of a time-domain window size, a time-domain frequency hopping interval, or a JCE enabled/disabled.

In an embodiment, determining the first frequency hopping pattern for the uplink channel corresponding to the terminal device as disabled in case that a value of the time-domain window size or the time-domain frequency hopping interval in the JCE association configuration is 1.

In an embodiment, the steps further include:

receiving second DCI transmitted from the network device;

the determining the frequency hopping pattern for the uplink channel corresponding to the terminal device based on the higher layer signaling includes:

determining configured multiple candidate frequency hopping patterns based on the higher layer signaling in case that the higher layer signaling is configured with the multiple candidate frequency hopping patterns; and determining the frequency hopping pattern for the uplink channel corresponding to the terminal device among the multiple candidate hopping patterns based on the second DCI.

In an embodiment, in case that the higher layer signaling is configured with the multiple candidate frequency hopping patterns, the determining the configured multiple candidate frequency hopping patterns based on the higher layer signaling includes:

determining the multiple candidate frequency hopping patterns based on the higher layer signaling in case that the uplink channel is a physical uplink shared channel (PUSCH); and determining the multiple candidate frequency hopping patterns based on the higher layer signaling in case that the uplink channel is a physical uplink control channel (PUCCH).

In an embodiment, in case that the uplink channel is PUSCH, the determining the multiple candidate frequency hopping patterns based on the higher layer signaling includes:

determining the multiple candidate frequency hopping patterns based on the first IE configured in PUSCH-config by the higher layer signaling; or determining the multiple candidate frequency hopping patterns based on the second IE configured in PUSCH-config by the higher layer signaling, where the first frequency hopping pattern among the multiple candidate frequency hopping patterns is determined based on the second IE configured in PUSCH-config by the higher layer signaling, and other frequency hopping patterns other than the first frequency hopping pattern among the multiple candidate hopping patterns are determined based on the first IE configured in PUSCH-config by the higher layer signaling; or determining multiple candidate frequency hopping patterns including the first frequency hopping pattern based on the JCE association configuration in the higher layer signaling.

In an embodiment, the determining the multiple candidate frequency hopping patterns based on the first IE configured in PUSCH-config by the higher layer signaling includes:

the determined multiple candidate frequency hopping patterns include the first frequency hopping pattern.

In an embodiment, in case that the uplink channel is PUCCH, the determining the multiple candidate frequency hopping patterns based on the higher layer signaling includes:

determining the multiple candidate frequency hopping patterns based on the third IE configured in PUCCH-config by the higher layer signaling, where the first frequency hopping pattern among the multiple candidate frequency hopping patterns is determined based on the third IE configured in PUCCH-config by the higher layer signaling, and other frequency hopping patterns other than the first frequency hopping pattern among the multiple candidate hopping patterns are determined based on the fourth IE configured in PUCCH-config by the higher layer signaling; or determining the multiple candidate frequency hopping patterns including the first frequency hopping pattern based on a joint channel estimation (JCE) association configuration in the higher layer signaling.

In an embodiment, the JCE association configuration includes at least one of a time-domain window size, a time-domain frequency hopping interval, or a JCE enabled/disabled.

In an embodiment, determining the first frequency hopping pattern for the uplink channel corresponding to the terminal device as disabled in case that a value of the time-domain window size or the time-domain frequency hopping interval in the JCE association configuration is 1.

In an embodiment, the second DCI includes at least one of uplink DCI for scheduling PUSCH or downlink DCI for scheduling PDSCH corresponding to HARQ-ACK transmitted on PUCCH.

In an embodiment, the determining the frequency hopping pattern for the uplink channel corresponding to the terminal device based on the second DCI includes:

determining the frequency hopping pattern for the uplink channel corresponding to the terminal device based on a first indication field in the second DCI, where a state value of the first indication field corresponds one-to-one with the frequency hopping pattern; or determining the frequency hopping pattern for the uplink channel corresponding to the terminal device based on an expanded frequency hopping flag field in the second DCI, where a state value of the expanded frequency hopping flag field corresponds one-to-one with the frequency hopping pattern; or determining the frequency hopping pattern for the uplink channel corresponding to the terminal device based on a frequency hopping flag field in the second DCI, where a state value of the frequency hopping flag field corresponds one-to-one with the frequency hopping pattern.

Figure 7:
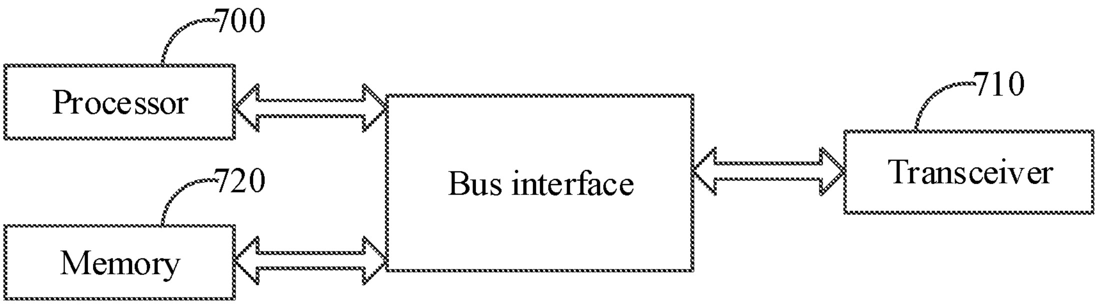
FIG. 7 is a schematic structural diagram of a network side device according to an embodiment of the present application.

FIG. 7 is a schematic structural diagram of a network side device according to an embodiment of the present application. As shown in FIG. 7, the network side device includes a memory 720, a transceiver 710, and a processor 700, where the processor 700 and the memory 720 may also be arranged physically separately.

The memory 720 is configured for storing a computer program; the transceiver 710 is configured for transmitting and receiving data under control of the processor 700.

In an embodiment, the transceiver 710 is configured for receiving and transmitting data under the control of the processor 700.

In FIG. 7, the bus architecture may include any number of interconnected buses and bridges, which are connected together by one or more processors represented by the processor 700 and various circuits of memory represented by the memory 720. The bus architecture may also link various other circuits such as peripherals, voltage regulators, and power management circuits, which are all well known in the art and therefore will not be described further herein. The bus interface provides an interface. The transceiver 710 may be multiple elements, including a transmitter and a receiver, providing a device for communicating with various other devices over transmission media, including wireless channels, wired channels, optical cables, and other transmission media.

The processor 700 is configured for managing the bus architecture and general processing, and the memory 700 can store data used by the processor 720 when performing operations The processor 700 may be a CPU, an ASIC, an FPGA, or a CPLD, and the processor may also adopt a multi-core architecture.

The processor 700 is configured for executing any of the methods provided in the embodiments of the present application by calling the computer program stored in the memory 720, in accordance with the obtained executable instructions, such as:

transmitting higher layer signaling to a terminal device, where the higher layer signaling is configured with a first frequency hopping pattern or multiple candidate frequency hopping patterns.

In an embodiment, in case that the uplink channel is a physical uplink shared channel (PUSCH), transmitting the higher layer signaling to the terminal device includes:

transmitting higher layer signaling to the terminal device and configuring the first frequency hopping pattern;

after the transmitting higher layer signaling to the terminal device, the steps further includes:

transmitting first downlink control information (DCI) to the terminal device; and indicating the first frequency hopping pattern of the terminal device as enabled or disabled based on the first DCI.

In an embodiment, configuring the first frequency hopping pattern includes:

configuring the first frequency hopping pattern based on a first information element (IE) configured in PUSCH-config by the higher layer signaling; or configuring the first frequency hopping pattern based on a second IE configured in PUSCH-config by the higher layer signaling; or configuring the first frequency hopping pattern based on a JCE association configuration in the higher layer signaling, as well as an interSlot or interRepetition frequency hopping pattern configured in PUSCH-config by the higher layer signaling.

In an embodiment, in case that the uplink channel is a physical uplink control channel (PUCCH), the transmitting higher layer signaling to the terminal device includes:

transmitting higher layer signaling to the terminal device and configuring the first frequency hopping pattern.

In an embodiment, configuring the first frequency hopping pattern includes:

configuring the first frequency hopping pattern based on a third IE configured in PUCCH-config by the higher layer signaling; or configuring the first frequency hopping pattern based on the JCE association configuration in the higher layer signaling, as well as the interSlot frequency hopping pattern configured in PUCCH-config by the higher layer signaling.

In an embodiment, the JCE association configuration includes at least one of a time-domain window size, a time-domain frequency hopping interval, or a JCE enabled/disabled.

In an embodiment, the transmitting higher layer signaling to the terminal device includes:

transmitting higher layer signaling to the terminal device, where the higher layer signaling is configured with multiple candidate frequency hopping patterns;

after the transmitting higher layer signaling to the terminal device, the steps further includes:

transmitting second DCI to the terminal device; and indicating the terminal device to determine a frequency hopping pattern for the corresponding uplink channel among the multiple candidate hopping patterns based on the second DCI.

In an embodiment, the transmitting higher layer signaling to the terminal device, where the higher layer signaling is configured with multiple candidate frequency hopping patterns includes:

in case that the uplink channel is PUSCH, configuring multiple candidate frequency hopping patterns based on the higher layer signaling;

in case that the uplink channel is PUCCH, configuring multiple candidate frequency hopping patterns based on the higher layer signaling.

In an embodiment, in case that the uplink channel is PUSCH, configuring multiple candidate frequency hopping patterns based on the higher layer signaling includes:

configuring multiple candidate frequency hopping patterns based on the first IE configured in PUSCH-config by the higher layer signaling; or configuring multiple candidate frequency hopping patterns based on the second IE configured in PUCCH-config by the higher layer signaling, where the first frequency hopping pattern among the multiple candidate hopping patterns is determined based on the second IE configured in PUSCH-config by the higher layer signaling, and other frequency hopping patterns other than the first frequency hopping pattern among the multiple candidate hopping patterns are determined based on the first IE configured in PUSCH-config by the higher layer signaling; or configuring multiple candidate frequency hopping patterns including the first frequency hopping pattern based on the JCE association configuration in the higher layer signaling.

In an embodiment, the determining the multiple candidate frequency hopping patterns based on the first IE configured in PUSCH-config by the higher layer signaling includes:

the determined multiple candidate frequency hopping patterns include the first frequency hopping pattern.

In an embodiment, in case that the uplink channel is PUCCH, configuring multiple candidate frequency hopping patterns based on the higher layer signaling includes:

determining multiple candidate frequency hopping patterns based on the third IE configured in PUCCH-config by the higher layer signaling, where the first frequency hopping pattern among the multiple candidate frequency hopping patterns is determined based on the third IE configured in PUCCH-config by the higher layer signaling, and other frequency hopping patterns other than the first frequency hopping pattern among the multiple candidate hopping patterns are determined based on a fourth IE configured in PUCCH-config by the higher layer signaling; or configuring multiple candidate frequency hopping patterns including the first frequency hopping pattern based on the JCE association configuration in the higher layer signaling.

In an embodiment, the JCE association configuration includes at least one of a time-domain window size, a time-domain frequency hopping interval, or a JCE enabled/disabled.

In an embodiment, the second DCI includes at least one of uplink DCI for scheduling PUSCH or downlink DCI for scheduling PDSCH corresponding to HARQ-ACK transmitted on PUCCH.

In an embodiment, indicating the terminal device to determine the frequency hopping pattern for the corresponding uplink channel based on the second DCI includes:

- indicating the terminal device to determine the frequency hopping pattern for the corresponding uplink channel based on a first indication field in the second DCI, where a state value of the first indication field corresponds one-to-one with the frequency hopping pattern; or
- indicating the terminal device to determine the frequency hopping pattern for the corresponding uplink channel based on an expanded frequency hopping flag field in the second DCI, where a state value of the expanded frequency hopping flag field corresponds one-to-one with the frequency hopping pattern; or
- indicating the terminal device to determine the frequency hopping pattern for the corresponding uplink channel based on a frequency hopping flag field in the second DCI, where a state value of the frequency hopping flag field corresponds one-to-one with the frequency hopping pattern.

It should be noted that the terminal and network side devices provided in the embodiments of the present application may achieve all the method steps implemented in the above method embodiments and achieve the same effects. Therefore, the same parts and beneficial effects as in the method embodiments in this embodiment will not be elaborated in detail.

Figure 8:
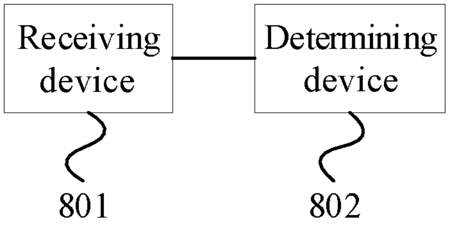
FIG. 8 is a schematic structural diagram of a frequency hopping indication apparatus applied to a terminal device.

FIG. 8 is a schematic structural diagram of a frequency hopping indication apparatus applied to a terminal device. As shown in FIG. 8, the apparatus includes:

- a receiving module 801, used for receiving a higher layer signaling transmitted from a network device, where the higher layer signaling is configured with a first frequency hopping pattern or multiple candidate frequency hopping patterns; and
- a determining module 802, used for the determining the frequency hopping pattern for the uplink channel corresponding to the terminal device based on the higher layer signaling.

In an embodiment, in case that the uplink channel is a physical uplink shared channel (PUSCH), the receiving module 801 is further used for:

- receiving first downlink control information (DCI) transmitted from the network device;
- the determining module 802 is further used for:
- determining the first frequency hopping pattern based on the higher layer signaling in case that the higher layer signaling is configured with the first frequency hopping pattern; and
- determining the first frequency hopping pattern as enabled or disabled based on the first DCI.

In an embodiment, the determining module 802 is further used for determining the first frequency hopping pattern, including:

- determining the first frequency hopping pattern based on a first information element (IE) configured in PUSCH-config by the higher layer signaling; or
- determining the first frequency hopping pattern based on a second IE configured in PUSCH-config by the higher layer signaling; or
- determining the first frequency hopping pattern based on a joint channel estimation (JCE) association configuration in the higher layer signaling, as well as an interSlot or interRepetition frequency hopping pattern configured in PUSCH-config by the higher layer signaling.

In an embodiment, in case that the uplink channel is a physical uplink control channel (PUCCH), the determining module 802 is further used for:

- determining the first frequency hopping pattern based on the higher layer signaling in case that the higher layer signaling is configured with the first frequency hopping pattern.

In an embodiment, the determining module 802 is further used for determining the first frequency hopping pattern based on a third IE configured in PUCCH-config by the higher layer signaling; or

- determining the first frequency hopping pattern based on a JCE association configuration in the higher layer signaling, as well as an interSlot frequency hopping pattern configured in PUCCH-config by the higher layer signaling.

In an embodiment, the JCE association configuration includes at least one of a time-domain window size, a time-domain frequency hopping interval, or a JCE enabled/disabled.

In an embodiment, determining the first frequency hopping pattern for the uplink channel corresponding to the terminal device as disabled in case that a value of the time-domain window size or the time-domain frequency hopping interval in the JCE association configuration is 1.

In an embodiment, the receiving module 801 is further used for:

- receiving second DCI transmitted from the network device;
- the determining module 802 is further used for determining configured multiple candidate frequency hopping patterns based on the higher layer signaling in case that the higher layer signaling is configured with multiple candidate frequency hopping modes.
- determining the frequency hopping pattern for the uplink channel corresponding to the terminal device among the multiple candidate hopping patterns based on the second DCI.

In an embodiment, in case that the higher layer signaling is configured with the multiple candidate frequency hopping patterns, the determining the configured multiple candidate frequency hopping patterns based on the higher layer signaling includes:

- determining the multiple candidate frequency hopping patterns based on the higher layer signaling in case that the uplink channel is a PUSCH; and
- determining the multiple candidate frequency hopping patterns based on the higher layer signaling in case that the uplink channel is a PUCCH.

In an embodiment, the determining module 802 is further used for, in case that the uplink channel is PUSCH, the determining the multiple candidate frequency hopping patterns based on the higher layer signaling, including:

- determining the multiple candidate frequency hopping patterns based on the first IE configured in PUSCH-config by the higher layer signaling; or
- determining the multiple candidate frequency hopping patterns based on the second IE configured in PUSCH-config by the higher layer signaling, where the first frequency hopping pattern among the multiple candidate frequency hopping patterns is determined based on the second IE configured in PUSCH-config by the higher layer signaling, and other frequency hopping patterns other than the first frequency hopping pattern among the multiple candidate hopping patterns are determined based on the first IE configured in PUSCH-config by the higher layer signaling; or determining the multiple candidate frequency hopping patterns including the first frequency hopping pattern based on the JCE association configuration in the higher layer signaling.

In an embodiment, the determining the multiple candidate frequency hopping patterns based on the first IE configured in PUSCH-config by the higher layer signaling includes:

the determined multiple candidate frequency hopping patterns include the first frequency hopping pattern.

In an embodiment, the determining module 802 is further used for determining the multiple candidate frequency hopping patterns based on the higher layer signaling in case that the uplink channel is PUCCH, including:

determining the multiple candidate frequency hopping patterns based on the third IE configured in PUCCH-config by the higher layer signaling, where the first frequency hopping pattern among the multiple candidate frequency hopping patterns is determined based on the third IE configured in PUCCH-config by the higher layer signaling, and other frequency hopping patterns other than the first frequency hopping pattern among the multiple candidate hopping patterns are determined based on the fourth IE configured in PUCCH-config by the higher layer signaling; or determining the multiple candidate frequency hopping patterns including the first frequency hopping pattern based on the JCE association configuration in the higher layer signaling.

In an embodiment, the JCE association configuration includes at least one of a time-domain window size, a time-domain frequency hopping interval, or a JCE enabled/disabled.

In an embodiment, determining the first frequency hopping pattern for the uplink channel corresponding to the terminal device as disabled in case that a value of the time-domain window size or the time-domain frequency hopping interval in the JCE association configuration is 1.

In an embodiment, the second DCI includes at least one of uplink DCI for scheduling PUSCH or downlink DCI for scheduling PDSCH corresponding to HARQ-ACK transmitted on PUCCH.

In an embodiment, the determining the frequency hopping pattern for the uplink channel corresponding to the terminal device based on the second DCI includes:

determining the frequency hopping pattern for the uplink channel corresponding to the terminal device based on a first indication field in the second DCI, where a state value of the first indication field corresponds one-to-one with the frequency hopping pattern; or determining the frequency hopping pattern for the uplink channel corresponding to the terminal device based on an expanded frequency hopping flag field in the second DCI, where a state value of the expanded frequency hopping flag field corresponds one-to-one with the frequency hopping pattern; or determining the frequency hopping pattern for the uplink channel corresponding to the terminal device based on a frequency hopping flag field in the second DCI, where a state value of the frequency hopping flag field corresponds one-to-one with the frequency hopping pattern.

Figure 9:
FIG. 9 is a schematic structural diagram of a frequency hopping indication apparatus applied to a network side device according to an embodiment of the present application.

FIG. 9 is a schematic structural diagram of a frequency hopping indication apparatus applied to a network side device according to an embodiment of the present application. As shown in FIG. 9, the network side apparatus includes:

a transmitting module 901, used for transmitting higher layer signaling to a terminal device, where the higher layer signaling is configured with a first frequency hopping pattern or multiple candidate frequency hopping patterns.

In an embodiment, in case that the uplink channel is a physical uplink shared channel (PUSCH), transmitting the higher layer signaling to the terminal device includes:

transmitting higher layer signaling to the terminal device and configuring the first frequency hopping pattern;

after the transmitting higher layer signaling to the terminal device, the transmitting module 901 is further used for:

transmitting first downlink control information (DCI) to the terminal device; and indicating the first frequency hopping pattern of the terminal device as enabled or disabled based on the first DCI.

In an embodiment, the network side apparatus further includes a configuration module 902, and, during the process of configuring the first frequency hopping pattern, the configuration module 902 is configured for:

configuring the first frequency hopping pattern based on a first information element (IE) configured in PUSCH-config by the higher layer signaling; or configuring the first frequency hopping pattern based on a second IE configured in PUSCH-config by the higher layer signaling; or configuring the first frequency hopping pattern based on a JCE association configuration in the higher layer signaling, as well as an interSlot or interRepetition frequency hopping pattern configured in PUSCH-config by the higher layer signaling.

In an embodiment, in case that the uplink channel is a physical uplink control channel (PUCCH), the transmitting higher layer signaling to the terminal device includes:

transmitting higher layer signaling to the terminal device and configuring the first frequency hopping pattern.

In an embodiment, during the process of configuring the first frequency hopping pattern, the configuration module 902 is configured for:

configuring the first frequency hopping pattern based on a third IE configured in PUCCH-config by the higher layer signaling; or configuring the first frequency hopping pattern based on the JCE association configuration in the higher layer signaling, as well as the interSlot frequency hopping pattern configured in PUCCH-config by the higher layer signaling.

In an embodiment, the JCE association configuration includes at least one of a time-domain window size, a time-domain frequency hopping interval, or a JCE enabled/disabled.

In an embodiment, the transmitting higher layer signaling to the terminal device includes:

transmitting higher layer signaling to the terminal device, where the higher layer signaling is configured with multiple candidate frequency hopping patterns;

after the transmitting higher layer signaling to the terminal device, the transmitting module 901 is further used for:

transmitting second DCI to the terminal device; and indicating the terminal device to determine a frequency hopping pattern for the corresponding uplink channel among the multiple candidate hopping patterns based on the second DCI.

In an embodiment, the transmitting higher layer signaling to the terminal device, where the higher layer signaling is configured with multiple candidate frequency hopping patterns includes:

in case that the uplink channel is PUSCH, configuring multiple candidate frequency hopping patterns based on the higher layer signaling;

in case that the uplink channel is PUCCH, configuring multiple candidate frequency hopping patterns based on the higher layer signaling.

In an embodiment, the configuration module 902 is further used for, in case that the uplink channel is PUSCH, configuring multiple candidate frequency hopping patterns based on the higher layer signaling, including:

configuring multiple candidate frequency hopping patterns based on the first IE configured in PUSCH-config by the higher layer signaling; or configuring multiple candidate frequency hopping patterns based on the second IE configured in PUCCH-config by the higher layer signaling, where the first frequency hopping pattern among the multiple candidate hopping patterns is determined based on the second IE configured in PUSCH-config by the higher layer signaling, and other frequency hopping patterns other than the first frequency hopping pattern among the multiple candidate hopping patterns are determined based on the first IE configured in PUSCH-config by the higher layer signaling; or configuring multiple candidate frequency hopping patterns including the first frequency hopping pattern based on the JCE association configuration in the higher layer signaling.

In an embodiment, the network side apparatus further includes a determining module 903, used for determining the multiple candidate frequency hopping patterns based on the first IE configured in PUSCH-config by the higher layer signaling, including:

the determined multiple candidate frequency hopping patterns include the first frequency hopping pattern.

In an embodiment, the configuration module 902 is further used for, in case that the uplink channel is PUCCH, configuring multiple candidate frequency hopping patterns based on the higher layer signaling, including:

determining multiple candidate frequency hopping patterns based on the third IE configured in PUCCH-config by the higher layer signaling, where the first frequency hopping pattern among the multiple candidate frequency hopping patterns is determined based on the third IE configured in PUCCH-config by the higher layer signaling, and other frequency hopping patterns other than the first frequency hopping pattern among the multiple candidate hopping patterns are determined based on a fourth IE configured in PUCCH-config by the higher layer signaling; or configuring multiple candidate frequency hopping patterns including the first frequency hopping pattern based on the JCE association configuration in the higher layer signaling In an embodiment, the JCE association configuration includes at least one of a time-domain window size, a time-domain frequency hopping interval, or a JCE enabled/disabled.

In an embodiment, the second DCI includes at least one of uplink DCI for scheduling PUSCH or downlink DCI for scheduling PDSCH corresponding to HARQ-ACK transmitted on PUCCH.

In an embodiment, the determining module 903 is further used for indicating the terminal device to determine the frequency hopping pattern for the corresponding uplink channel based on the second DCI, including:

indicating the terminal device to determine the frequency hopping pattern for the corresponding uplink channel based on a first indication field in the second DCI, where a state value of the first indication field corresponds one-to-one with the frequency hopping pattern; or indicating the terminal device to determine the frequency hopping pattern for the corresponding uplink channel based on an expanded frequency hopping flag field in the second DCI, where a state value of the expanded frequency hopping flag field corresponds one-to-one with the frequency hopping pattern; or indicating the terminal device to determine the frequency hopping pattern for the corresponding uplink channel based on a frequency hopping flag field in the second DCI, where a state value of the frequency hopping flag field corresponds one-to-one with the frequency hopping pattern.

It should be noted that, the division of units in the embodiments of the present application is schematic, and is only a logical function division, and other division manners may be performed in actual implementation. In an embodiment, the functional units in the various embodiments of the present application can be integrated into one processing unit/module, or each unit/module can exist alone physically, or two or more units/modules can be integrated into one unit/module. The aforementioned integrated unit/module can be implemented in the form of hardware or software functional unit.

In case that the integrated unit/module is implemented in the form of a software functional unit/module and sold or used as an independent product, it can be stored in a processor readable storage medium. Based on such understanding, the solutions of the present application in essence or a part of the solutions that contributes to the related art, or all or part of the solutions, can be embodied in the form of a software product, which is stored in a storage medium, including several instructions to cause a computer device (which can be a personal computer, server, or network device, etc.) or a processor to perform all or part of the steps of the methods described in the respective embodiments of the present application. The storage medium described above includes various media that can store program codes, such as USB flash disk, mobile hard disk, read-only memory (ROM), random access memory (RAM), magnetic disk, or optical disk.

It should be noted that the above-mentioned apparatus provided in the embodiments of the present application may achieve all the method steps implemented in the above method embodiments, and may achieve the same effect. The same parts and beneficial effects as in the method embodiments in this embodiment will not be elaborated in detail.

The present application further provides a computer program product, which includes a computer program stored on a non-transient computer-readable storage medium. The computer program includes a program instruction, and in case that the program instruction is executed by the computer, the computer is able to execute the steps of the frequency hopping indication method provided by the above methods, for example, including:

receiving a higher layer signaling transmitted from a network device, where the higher layer signaling is configured with a first frequency hopping pattern or multiple candidate frequency hopping patterns; and determining a frequency hopping pattern for an uplink channel corresponding to the terminal device based on the higher layer signaling.

The present application further provides a computer program product, which includes a computer program stored on a non-transient computer-readable storage medium. The computer program includes a program instruction, and in case that the program instruction is executed by the computer, the computer is able to execute the steps of the frequency hopping indication method provided by the above methods, for example, including:

transmitting higher layer signaling to a terminal device, where the higher layer signaling is configured with a first frequency hopping pattern or multiple candidate frequency hopping patterns.

An embodiment of the present application further provides a processor readable storage medium, where the processor readable storage medium stores a computer program for causing the processor to execute the frequency hopping indication methods provided in the aforementioned embodiments, for example, the method including:

receiving a higher layer signaling transmitted from a network device, where the higher layer signaling is configured with a first frequency hopping pattern or multiple candidate frequency hopping patterns; and determining a frequency hopping pattern for an uplink channel corresponding to the terminal device based on the higher layer signaling.

An embodiment of the present application further provides a processor readable storage medium, where the processor readable storage medium stores a computer program for causing the processor to execute the frequency hopping indication methods provided in the aforementioned embodiments, for example, the method including:

transmitting higher layer signaling to a terminal device, where the higher layer signaling is configured with a first frequency hopping pattern or multiple candidate frequency hopping patterns.

The processor readable storage medium can be any available medium or data storage device that can be accessed by the processor, including but not limited to, a magnetic storage (e.g., a floppy disk, a hard disk, a magnetic tape, a magneto-optical disk (MO), etc.), an optical memory (such as CD, DVD, BD, HVD, etc.), and a semiconductor memory (such as ROM, EPROM, EEPROM, non-volatile memory (NAND FLASH), solid-state drive (SSD)), etc.

The solutions according to the embodiments of the present application can be applicable to various systems, especially to 5G systems. For example, the applicable systems can be a global system of mobile communication (GSM) system, a code division multiple access (CDMA) system, a wideband code division multiple access (WCDMA) general packet radio service (GPRS) system, a long term evolution (LTE) system, an LTE frequency division duplex (FDD) system, an LTE time division duplex (TDD) system, a long term evolution advanced (LTE-A) system, a universal mobile telecommunication system (UMTS), a worldwide interoperability for microwave access (WiMAX) system, a 5G new radio (NR) system, etc. These various systems include a terminal and a network device, and can further include a core network part, such as an evolved packet system (EPS), a 5G system (5GS), and the like.

The network device in the embodiments of the present application can be a base station, and the base station can include multiple cells providing services for the terminal. Depending on the specific scenario, the base station may be called an access point, or a device communicating with a wireless terminal device through one or more sectors on the air interface in the access network, or other names. The network device can be used for exchanging received air frames with Internet Protocol (IP) packets, and acting as a router between the wireless terminal device and the rest of the access network, where the rest of the access network can include an IP communication network. The network device can also coordinate attribute management for the air interface. For example, the network device in the embodiments of the present application may be a base transceiver station (BTS) in a global system for mobile communications (GSM) or a code division multiple access (CDMA), or may be a node B in a wide-band code division multiple access (WCDMA), or may be an evolutional NodeB (eNB or e-Node B) in a long term evolution (LTE) system, or may be a 5G gNB in 5G network architecture (next generation system), or may be a home evolved node B (HeNB), a relay node, a femto, or a pico, etc., which is not limited in the embodiments of the present application. In some network structures, the network device may include a centralized unit (CU) node and a distributed unit (DU) node, and the centralized unit and the distributed unit may be geographically separated.

The terminal device in the embodiments of the present application can be a device that provides voice and/or data connectivity to a user, a handheld device with a wireless connection function, or other processing devices connected to a wireless modem. In different systems, the names of the terminal may be different. For example, in the 5G system, the terminal may be called as a user equipment (UE). A wireless terminal device can communicate with one or more core networks (CNs) via a radio access network (RAN), and the wireless terminal can be a mobile terminal device, such as a mobile phone (or cellular phone) and a computer with mobile terminal device, e.g., a portable mobile device, a pocket-sized mobile device, a handheld mobile device, a computer-built mobile device or a vehicle-mounted mobile device, which exchange language and/or data with the radio access network. For example, a personal communication service (PCS) phone, a radio phone, a session-initiated protocol (SIP) phone, a wireless local loop (WLL) station, a personal digital assistant (PDA) and other devices. A wireless terminal device may also be called a system, a subscriber unit, a subscriber station, a mobile station, a mobile platform, a remote station, an access point, a remote terminal, an access terminal, a user terminal, a user agent, or a user device, which is not limited in the embodiments of the present application.

A multi-input multi-output (MIMO) transmission may be performed between the network device and the terminal by using one or more antennas. The MIMO transmission may be single-user MIMO (SU-MIMO) or multi-user MIMO (MU-MIMO). Depending on the form and number of antenna combinations, MIMO transmission can be 2D-MIMO, 3D-MIMO, FD-MIMO or massive-MIMO, and may also be diversity transmission, precoding transmission, beamforming transmission, etc.

Embodiments of the present application may be provided as a method, system, or computer program product. Accordingly, the present application may take the form of an entirely hardware embodiment, an entirely software embodiment, or an embodiment combining software and hardware aspects. Furthermore, the present application may take the form of a computer program product embodied on one or more computer-usable storage media having computer-usable program code embodied therein, including but not limited to disk storage, optical storage, and the like.

The present application is described with reference to flow charts and/or block diagrams of methods, apparatus (systems), and computer program products according to embodiments of the present application. It will be understood that each flow and/or block in the flow charts and/or block diagrams, and combinations thereof can be implemented by processor-executable instructions. These processor-executable instructions may be provided to processors of a general-purpose computer, a special purpose computer, an embedded processor or other programmable data processing device to produce a machine and the instructions executed by the processor of the computer or other programmable data processing device form a means for performing the functions specified in one or more flows in a flowchart and/or one or more blocks of a block diagram.

These processor-executable instructions may be stored in processor-readable memory capable of directing a computer or other programmable data processing apparatus to operate in a particular manner, and the instructions stored in the processor-readable memory may result in a manufacture including instruction means, the instruction means can perform the functions specified in one or more flows of the flowchart and/or one or more blocks of the block diagram.

These processor-executable instructions can also be loaded onto a computer or other programmable data processing device to cause a series of operational steps to be performed on the computer or other programmable device to produce a computer-implemented process and instructions performed on the computer or other programmable devices provide steps for performing the functions specified in one or more flows of the flowchart and/or one or more blocks of the block diagram.

What is claimed is:

1. A frequency hopping indication method, applied to a terminal device, comprising:

receiving a higher layer signaling transmitted from a network device, wherein the higher layer signaling is configured with a first frequency hopping pattern or multiple candidate frequency hopping patterns; and determining a frequency hopping pattern for an uplink channel corresponding to the terminal device based on the higher layer signaling, wherein in case that the uplink channel is a physical uplink shared channel (PUSCH), the method further comprises:

receiving first downlink control information (DCI) transmitted from the network device;

the determining the frequency hopping pattern for the uplink channel corresponding to the terminal device based on the higher layer signaling comprises:

determining the first frequency hopping pattern based on the higher layer signaling in case that the higher layer signaling is configured with the first frequency hopping pattern; and determining the first frequency hopping pattern as enabled or disabled based on the first DCI;

wherein the determining the first frequency hopping pattern comprises:

determining the first frequency hopping pattern based on a first information element (IE) configured in PUSCH-config by the higher layer signaling; or determining the first frequency hopping pattern based on a second IE configured in PUSCH-config by the higher layer signaling; or determining the first frequency hopping pattern based on a joint channel estimation (JCE) association configuration in the higher layer signaling, as well as an interSlot or inter Repetition frequency hopping pattern configured in PUSCH-config by the higher layer signaling.

2. The method of claim 1, wherein the JCE association configuration comprises at least one of a time-domain window size, a time-domain frequency hopping interval, or a JCE enabled/disabled.

3. The method of claim 2, wherein:

determining the first frequency hopping pattern for the uplink channel corresponding to the terminal device as disabled in case that a value of the time-domain window size or the time-domain frequency hopping interval in the JCE association configuration is 1.

4. The method of claim 1, wherein in case that the uplink channel is a physical uplink control channel (PUCCH), the determining the frequency hopping pattern for the uplink channel corresponding to the terminal device based on the higher layer signaling comprises:

determining the first frequency hopping pattern based on the higher layer signaling in case that the higher layer signaling is configured with the first frequency hopping pattern;

wherein the determining the first frequency hopping pattern comprises:

determining the first frequency hopping pattern based on a third IE configured in PUCCH-config by the higher layer signaling; or determining the first frequency hopping pattern based on a JCE association configuration in the higher layer signaling, as well as an interSlot frequency hopping pattern configured in PUCCH-config by the higher layer signaling, wherein the JCE association configuration comprises at least one of a time-domain window size, a time-domain frequency hopping interval, or a JCE enabled/disabled.

5. The method of claim 4, wherein:

determining the first frequency hopping pattern for the uplink channel corresponding to the terminal device as disabled in case that a value of the time-domain window size or the time-domain frequency hopping interval in the JCE association configuration is 1.

6. The method of claim 1, wherein the method further comprises:

receiving second DCI transmitted from the network device;

the determining the frequency hopping pattern for the uplink channel corresponding to the terminal device based on the higher layer signaling comprises:

determining configured multiple candidate frequency hopping patterns based on the higher layer signaling in case that the higher layer signaling is configured with the multiple candidate frequency hopping patterns; and determining the frequency hopping pattern for the uplink channel corresponding to the terminal device among the multiple candidate hopping patterns based on the second DCI.

7. A frequency hopping indication method, applied to a network device, comprising:

transmitting a higher layer signaling to a terminal device, wherein the higher layer signaling is configured with a first frequency hopping pattern or multiple candidate frequency hopping patterns, wherein in case that an uplink channel is a physical uplink shared channel (PUSCH), the transmitting the higher layer signaling to the terminal device comprises:

transmitting the higher layer signaling to the terminal device and configuring the first frequency hopping pattern;

after the transmitting the higher layer signaling to the terminal device, the method further comprises:

transmitting first downlink control information (DCI) to the terminal device; and indicating the first frequency hopping pattern of the terminal device as enabled or disabled based on the first DCI;

wherein the configuring the first frequency hopping pattern comprises:

configuring the first frequency hopping pattern based on a first information element (IE) configured in PUSCH-config by the higher layer signaling; or configuring the first frequency hopping pattern based on a second IE configured in PUSCH-config by the higher layer signaling; or configuring the first frequency hopping pattern based on a joint channel estimation (JCE) association configuration in the higher layer signaling, as well as an inter Slot or inter Repetition frequency hopping pattern configured in PUSCH-config by the higher layer signaling.

8. The method of claim 7, wherein the JCE association configuration comprises at least one of a time-domain window size, a time-domain frequency hopping interval, or a JCE enabled/disabled.

9. The method of claim 7, wherein in case that the uplink channel is a physical uplink control channel (PUCCH), the transmitting the higher layer signaling to the terminal device comprises:

transmitting the higher layer signaling to the terminal device and configuring the first frequency hopping pattern;

wherein the configuring the first frequency hopping pattern comprises:

configuring the first frequency hopping pattern based on a third IE configured in PUCCH-config by the higher layer signaling; or configuring the first frequency hopping pattern based on a JCE association configuration in the higher layer signaling, as well as an interSlot frequency hopping pattern configured in PUCCH-config by the higher layer signaling, wherein the JCE association configuration comprises at least one of a time-domain window size, a time-domain frequency hopping interval, or a JCE enabled/disabled.

10. The method of claim 7, wherein the transmitting the higher layer signaling to the terminal device comprises:

transmitting the higher layer signaling to the terminal device, wherein the higher layer signaling is configured with the multiple candidate frequency hopping patterns;

after the transmitting the higher layer signaling to the terminal device, the method further comprises:

transmitting second DCI to the terminal device; and indicating, based on the second DCI, the terminal device to determine a frequency hopping pattern for a corresponding uplink channel among the multiple candidate hopping patterns.

11. A terminal device, comprising a memory, a transceiver, and a processor;

the memory is configured for storing a computer program; the transceiver is configured for transmitting and receiving data under control of the processor; the processor is configured for executing the computer program stored in the memory and implementing the following steps:

receiving a higher layer signaling transmitted from a network device, wherein the higher layer signaling is configured with a first frequency hopping pattern or multiple candidate frequency hopping patterns; and determining a frequency hopping pattern for an uplink channel corresponding to the terminal device based on the higher layer signaling, wherein in case that the uplink channel is a physical uplink shared channel (PUSCH), the steps further comprise:

receiving first downlink control information (DCI) transmitted from the network device;

the determining the frequency hopping pattern for the uplink channel corresponding to the terminal device based on the higher layer signaling comprises:

determining the first frequency hopping pattern based on the higher layer signaling in case that the higher layer signaling is configured with the first frequency hopping pattern; and determining the first frequency hopping pattern as enabled or disabled based on the first DCI;

wherein the determining the first frequency hopping pattern comprises:

determining the first frequency hopping pattern based on a first information element (IE) configured in PUSCH-config by the higher layer signaling; or determining the first frequency hopping pattern based on a second IE configured in PUSCH-config by the higher layer signaling; or determining the first frequency hopping pattern based on a joint channel estimation (JCE) association configuration in the higher layer signaling, as well as an interSlot or inter Repetition frequency hopping pattern configured in PUSCH-config by the higher layer signaling.

12. The terminal device of claim 11, wherein the JCE association configuration comprises at least one of a time-domain window size, a time-domain frequency hopping interval, or a JCE enabled/disabled.

13. The terminal device of claim 12, wherein:

determining the first frequency hopping pattern for the uplink channel corresponding to the terminal device as disabled in case that a value of the time-domain window size or the time-domain frequency hopping interval in the JCE association configuration is 1.

14. The terminal device of claim 11, wherein in case that the uplink channel is a physical uplink control channel (PUCCH), the determining the frequency hopping pattern for the uplink channel corresponding to the terminal device based on the higher layer signaling comprises:

determining the first frequency hopping pattern based on the higher layer signaling in case that the higher layer signaling is configured with the first frequency hopping pattern;

wherein the determining the first frequency hopping pattern comprises:

determining the first frequency hopping pattern based on a third IE configured in PUCCH-config by the higher layer signaling; or determining the first frequency hopping pattern based on a JCE association configuration in the higher layer signaling, as well as an interSlot frequency hopping pattern configured in PUCCH-config by the higher layer signaling, wherein the JCE association configuration comprises at least one of a time-domain window size, a time-domain frequency hopping interval, or a JCE enabled/disabled.

15. The terminal device of claim 14, wherein:

determining the first frequency hopping pattern for the uplink channel corresponding to the terminal device as disabled in case that a value of the time-domain window size or the time-domain frequency hopping interval in the JCE association configuration is 1.

16. The terminal device of claim 11, wherein the steps further comprise:

receiving second DCI transmitted from the network device;

the determining the frequency hopping pattern for the uplink channel corresponding to the terminal device based on the higher layer signaling comprises:

determining configured multiple candidate frequency hopping patterns based on the higher layer signaling in case that the higher layer signaling is configured with the multiple candidate frequency hopping patterns; and determining the frequency hopping pattern for the uplink channel corresponding to the terminal device among the multiple candidate hopping patterns based on the second DCI.

17. A network side device, comprising a memory, a transceiver, and a processor;

the memory is configured for storing a computer program; the transceiver is configured for transmitting and receiving data under control of the processor; the processor is configured for executing the computer program stored in the memory and implementing the following steps:

transmitting a higher layer signaling to a terminal device, wherein the higher layer signaling is configured with a first frequency hopping pattern or multiple candidate frequency hopping patterns, wherein in case that an uplink channel is a physical uplink shared channel (PUSCH), the transmitting higher layer signaling to the terminal device comprises:

transmitting the higher layer signaling to the terminal device and configuring the first frequency hopping pattern;

after the transmitting higher layer signaling to the terminal device, the steps further comprise:

transmitting first downlink control information (DCI) to the terminal device; and indicating the first frequency hopping pattern of the terminal device as enabled or disabled based on the first DCI;

wherein the configuring the first frequency hopping pattern comprises:

configuring the first frequency hopping pattern based on a first information element (IE) configured in PUSCH-config by the higher layer signaling; or configuring the first frequency hopping pattern based on a second IE configured in PUSCH-config by the higher layer signaling; or configuring the first frequency hopping pattern based on a joint channel estimation (JCE) association configuration in the higher layer signaling, as well as an interSlot or inter Repetition frequency hopping pattern configured in PUSCH-config by the higher layer signaling.

18. The network side device of claim 17, wherein the JCE association configuration comprises at least one of a time-domain window size, a time-domain frequency hopping interval, or a JCE enabled/disabled.

19. The network side device of claim 17, wherein in case that the uplink channel is a physical uplink control channel (PUCCH), the transmitting the higher layer signaling to the terminal device comprises:

transmitting the higher layer signaling to the terminal device and configuring the first frequency hopping pattern;

wherein the configuring the first frequency hopping pattern comprises:

configuring the first frequency hopping pattern based on a third information element (IE) configured in PUCCH-config by the higher layer signaling; or configuring the first frequency hopping pattern based on a joint channel estimation (JCE) association configuration in the higher layer signaling, as well as an interSlot frequency hopping pattern configured in PUCCH-config by the higher layer signaling, wherein the JCE association configuration comprises at least one of a time-domain window size, a time-domain frequency hopping interval, or a JCE enabled/disabled.

20. The network side device of claim 17, wherein the transmitting the higher layer signaling to the terminal device comprises:

transmitting the higher layer signaling to the terminal device, wherein the higher layer signaling is configured with the multiple candidate frequency hopping patterns;

after the transmitting the higher layer signaling to the terminal device, the steps further comprise:

transmitting second DCI to the terminal device; and indicating, based on the second DCI, the terminal device to determine a frequency hopping pattern for a corresponding uplink channel among the multiple candidate hopping patterns.

* * * * *